US012785223B2

(12) United States Patent
Xu et al.

(10) Patent No.: US 12,785,223 B2
(45) Date of Patent: Nov. 3, 2026

(54) BATTERY CELL, BATTERY, AND ELECTRICAL APPARATUS

(71) Applicant: CONTEMPORARY AMPEREX TECHNOLOGY CO., LIMITED, Ningde (CN)

(72) Inventors: Hu Xu, Ningde (CN); Siying Huang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 19/324,063

(22) Filed: Sep. 9, 2025

(65) Prior Publication Data

US 2026/0011884 A1 Jan. 8, 2026

Related U.S. Application Data

(63) Continuation of application No. PCT/CN2024/087410, filed on Apr. 12, 2024.

(30) Foreign Application Priority Data

Sep. 14, 2023 (CN) ......................... 202311186306.6

(51) Int. Cl.
*H01M 50/538* (2021.01)
*H01M 10/0525* (2010.01)
(Continued)

(52) U.S. Cl.
CPC ..... *H01M 50/538* (2021.01); *H01M 10/0525* (2013.01); *H01M 10/0587* (2013.01); (Continued)

(58) Field of Classification Search
CPC .................... H01M 50/531–538; H01M 50/55
See application file for complete search history.

(56) References Cited

U.S. PATENT DOCUMENTS

2023/0411808 A1* 12/2023 Li ........................ H01M 50/179
2024/0178493 A1* 5/2024 Xu ........................ H01M 50/188
2024/0250283 A1* 7/2024 Xu ........................ H01M 50/566

FOREIGN PATENT DOCUMENTS

CN 1345099 A 4/2002
CN 115051084 A 9/2022
(Continued)

OTHER PUBLICATIONS

International Search Report in the international application No. PCT/CN2023/087410, dated May 29, 2024, 6 pages with English translation.
ISA Written Opinion in the international application No. PCT/CN2023/121163, dated Mar. 29, 2024, 8 pages with English translation.
First Office Action in the CN application No. 202311186306.6, dated Nov. 1, 2023, 11 pages.

*Primary Examiner* — Robert S Carrico
(74) *Attorney, Agent, or Firm* — K&L Gates LLP

(57) ABSTRACT

A battery cell, a battery, and an electrical apparatus are provided. The battery cell includes a shell, an electrode terminal, and an electrode assembly. The shell has a wall portion, and the electrode terminal is mounted on the wall portion in an insulated manner. The electrode assembly includes a main body, a first tab, and a second tab of opposite polarities, both arranged at one end of the main body facing the wall portion in the thickness direction. A connecting portion protrudes from a first surface of the wall portion toward the electrode assembly and is electrically connected to the first tab. The electrode terminal is electrically connected to the second tab. This configuration optimizes the height of the first tab, improves contact between the first tab and the connecting portion, and eliminates the need for a special-shaped connecting component, thereby reducing assembly complexity.

18 Claims, 6 Drawing Sheets

(51) Int. Cl.
*H01M 10/0587* (2010.01)
*H01M 50/107* (2021.01)
*H01M 50/533* (2021.01)
*H01M 50/536* (2021.01)
*H01M 50/55* (2021.01)
*H01M 50/586* (2021.01)
*H01M 50/593* (2021.01)

(52) U.S. Cl.
CPC ....... *H01M 50/107* (2021.01); *H01M 50/533* (2021.01); *H01M 50/536* (2021.01); *H01M 50/55* (2021.01); *H01M 50/586* (2021.01); *H01M 50/593* (2021.01); *H01M 2220/20* (2013.01)

(56) References Cited

FOREIGN PATENT DOCUMENTS

| | | | | | |
|---|---|---|---|---|---|
| CN | 218887468 | A | | 4/2023 | |
| CN | 219371300 | U | * | 7/2023 | |
| CN | 116583998 | A | | 8/2023 | |
| CN | 116686159 | A | | 9/2023 | |
| CN | 116914279 | A | * | 10/2023 | ........ H01M 10/0587 |
| CN | 116936952 | A | | 10/2023 | |
| WO | 2023092450 | A1 | | 6/2023 | |
| WO | WO-2023092757 | A1 | * | 6/2023 | ........ H01M 10/0422 |

* cited by examiner

BATTERY CELL, BATTERY, AND ELECTRICAL APPARATUS

CROSS-REFERENCE TO RELATED APPLICATIONS

The present application is a continuation of International Application No. PCT/CN2024/087410, filed Apr. 12, 2024, which claims the priority of Chinese Patent Application No. 2023111863066 filed on Sep. 14, 2023 and entitled "BATTERY CELL, BATTERY, AND ELECTRICAL APPARATUS", which is incorporated herein by reference in its entirety.

TECHNICAL FIELD

The present application relates to the field of battery technologies, and in particular, to a battery cell, a battery, and an electrical apparatus.

BACKGROUND

In recent years, new energy vehicles have made a leap forward in development. In the field of electric vehicles, power batteries, as power sources of electric vehicles, play an irreplaceable and important role. With the vigorous promotion of new energy vehicles, the demand for power battery products is also growing. Batteries, as core components of new energy vehicles, have high requirements in terms of operational reliability. The battery cell usually includes a shell and an electrode assembly accommodated in the shell. However, the existing battery cells are difficult to assemble during the assembling process, which is not conducive to improving the production efficiency of the battery cells.

SUMMARY OF THE INVENTION

Embodiments of the present application provide a battery cell, a battery, and an electrical apparatus, which are capable of effectively improving the production efficiency of the battery cell.

In a first aspect, an embodiment of the present application provides a battery cell, including a shell, an electrode terminal, and an electrode assembly; the shell has a wall portion; the electrode terminal is mounted on the wall portion in an insulated manner; the electrode assembly is accommodated in the shell, the electrode assembly includes a main body part, a first tab, and a second tab, the first tab and the second tab have opposite polarities, and in a thickness direction of the wall portion, the first tab and the second tab are both arranged at one end of the main body part facing the wall portion; where in the thickness direction of the wall portion, the wall portion has a first surface facing the electrode assembly and a second surface facing away from the first surface, a connecting portion is arranged to protrude from the first surface, and a groove is formed on the second surface corresponding to a position of the connecting portion, the connecting portion is electrically connected to the first tab, and the electrode terminal is electrically connected to the second tab; the battery cell further includes a first current collecting member, the first current collecting member is connected to the first tab, a groove bottom wall of the groove is welded to the first current collecting member to electrically connect the first tab and the wall portion, or the groove bottom wall of the groove is welded to the first tab to electrically connect the first tab and the wall portion; in the thickness direction of the wall portion, a projection area of the groove is $S_1$, a projection area of the wall portion is $S_2$, meeting $0.1S_2 \leq S_1 \leq 0.5S_2$.

In the above technical solution, by arranging the first tab and the second tab of the electrode assembly at the same end of the main body part facing the wall portion in the thickness direction of the wall portion, it is beneficial to save the space occupied by the electrode assembly, so as to improve the energy density of the battery cell. The connecting portion is arranged to protrude from the first surface of the wall portion, and the connecting portion is configured to be electrically connected to the first tab, on the one hand, it is convenient for the wall portion to be electrically connected to the first tab through the connecting portion, which is conducive to optimizing the height of the first tab protruding from the main body part, and is conducive to improving the contact effect between the connecting portion and the first tab, thereby being capable of effectively improving the electrical connection effect between the wall portion and the first tab. On the other hand, it is capable of reducing the difficulty of electrical connection between the first tab and the wall portion, and there is no need to arrange a component of a special-shaped structure connecting the wall portion and the first tab between the wall portion and the first tab, so that the difficulty of assembling the battery cell is reduced, thereby effectively improving the production efficiency of the battery cell. In addition, the groove is formed on the second surface of the wall portion at a position corresponding to the connecting portion. On the one hand, the connecting portion of the wall portion is a concave-convex structure that can be formed by stamping, so that the connecting portion and the groove are respectively formed on both sides of the wall portion, which is convenient for manufacturing and helps reduce the difficulty of processing the connecting portion. On the other hand, the thickness of the connecting portion is capable of being thinned by the groove to reduce the difficulty of electrical connection between the connecting portion and the first tab. At the same time, by setting the projection area of the groove in the thickness direction of the wall portion to be greater than or equal to 0.1 times the projection area of the wall portion in the thickness direction of the wall portion, an area of a region where the connecting portion is thinned by the groove is increased, so that an area of the welding connection between the connecting portion and the first current collecting member or the first tab is capable of being effectively increased, which is conducive to improving a flow area between the connecting portion and the first tab. In addition, by setting the projection area of the groove in the thickness direction of the wall portion to be less than or equal to 0.5 times the projection area of the wall portion in the thickness direction of the wall portion, the phenomenon of the groove occupying too much space on the wall portion can be alleviated. On the one hand, it is conducive to improving the structural strength of the wall portion to reduce the risk of deformation or breakage of the wall portion during use. On the other hand, it is capable of alleviating the phenomenon that there is an excessively large protruding portion of the connecting portion in the region corresponding to the groove on the first surface of the wall portion, resulting in interference between the connecting portion and other components inside the battery cell.

In some embodiments, a minimum width of the groove is W, meeting $W \geq 5$ mm.

In the above technical solution, by setting the minimum width of the groove to be greater than or equal to 5 mm, so as to facilitate the welding connection between the groove bottom wall of the groove and the first current collecting member or the first tab, it is conducive to reducing the difficulty of welding the region of the connecting portion thinned by the groove and the first current collecting member or the first tab, thereby being capable of effectively alleviating the phenomenon that the width of the groove is too small to weld the groove bottom wall of the groove and the first current collecting member or the first tab.

In some embodiments, the groove is an arc-shaped groove extending in an arc trajectory.

In the above technical solution, the groove is set as the arc-shaped groove structure extending in the arc trajectory to facilitate processing and manufacturing, and a range of the region where the groove bottom wall of the groove and the first current collecting member or the first tab are welded to each other is capable of being expanded, thereby being capable of effectively improving an electrical connection effect between the wall portion and the first tab.

In some embodiments, the shell is cylindrical, a central axis of the shell extends in the thickness direction of the wall portion, and the central axis of the shell passes through the center of the arc trajectory of the groove.

In the above technical solution, the shell is set as a cylindrical structure, and the central axis of the shell is a structure extending in the thickness direction of the wall portion, so that the shape of the wall portion is circular. Therefore, the central axis of the shell is set as the center of the arc trajectory passing through the groove, so that the groove is an arc-shaped groove structure arranged around the central axis of the shell. On the one hand, it is conducive to improving the space utilization of the groove on the wall portion, and on the other hand, it is convenient for manufacturing, and is further capable of expanding the range of the region where the groove bottom wall of the groove and the first current collecting member or the first tab are welded to each other, so as to improve the electrical connection effect between the wall portion and the first tab.

In some embodiments, in the thickness direction of the wall portion, the dimension of the connecting portion protruding from the first surface is $D_1$, meeting $D_1 \leq 8$ mm.

In the above technical solution, by setting the dimension of the connecting portion protruding from the first surface to be less than or equal to 8 mm, on the one hand, the phenomenon of excessive space occupied by the connecting portion is capable of being reduced, which is conducive to improving the internal space utilization of the battery cell; on the other hand, the interference influence of the connecting portion on the electrical connection between the electrode terminal and the second tab is capable of being reduced.

In some embodiments, a plurality of the connecting portions are arranged to protrude from the first surface.

In the above technical solution, by arranging the plurality of connecting portions to protrude from the first surface of the wall portion, the wall portion is capable of being electrically connected to the first tab through the plurality of connecting portions, which is conducive to improving the effect of the mutual electrical connection between the wall portion and the first tab, and is capable of increasing the flow area between the wall portion and the first tab.

In some embodiments, the wall portion is provided with an assembly hole, the assembly hole penetrates the wall portion in the thickness direction of the wall portion, and the electrode terminal is arranged in the assembly hole and protrudes from the first surface.

In the above technical solution, the electrode terminal is a structure arranged to protrude from the first surface in the thickness direction of the wall portion, so as to facilitate electrical connection between the electrode terminal and the second tab, which helps reduce the difficulty of electrical connection between the electrode terminal and the second tab. Moreover, a height difference between an end face of the electrode terminal facing the electrode assembly and the first surface of the wall portion is capable of being compensated by the connecting portion protruding from the first surface of the wall portion, thereby effectively improving the electrical connection effect between the electrode terminal and the second tab while realizing electrical connection between the wall portion and the first tab.

In some embodiments, in the thickness direction of the wall portion, the dimension of the connecting portion protruding from the first surface is $D_1$, and the dimension of the electrode terminal protruding from the first surface is $D_2$, meeting $D_1 = D_2$.

In the above technical solution, by setting the dimension of the connecting portion protruding from the first surface to be the same as the dimension of the electrode terminal protruding from the first surface, an end face of the connecting portion facing the electrode assembly and the end face of the electrode terminal facing the electrode assembly are structures flush with each other in the thickness direction of the wall portion. On the one hand, the difficulties of electrical connections between the connecting portion and the first tab and between the electrode terminal and the second tab are capable of being reduced. On the other hand, a poor electrical connection effect between the connecting portion and the first tab or between the electrode terminal and the second tab due to mutual influence between the connecting portion and the electrode terminal is capable of being reduced.

In some embodiments, the battery cell further includes a first current collecting member and a second current collecting member. The first current collecting member is located between the connecting portion and the first tab, and the first current collecting member connects the connecting portion and the first tab. The second current collecting member is located between the electrode terminal and the second tab, the second current collecting member is arranged at an interval from the first current collecting member, and the second current collecting member connects the electrode terminal and the second tab.

In the above technical solution, by arranging the first current collecting member between the connecting portion of the wall portion and the first tab, and connecting the connecting portion and the first tab by the first current collecting member, electrical connection between the first tab and the wall portion is achieved, which is conducive to reducing the difficulty of electrical connection between the first tab and the connecting portion. Similarly, by arranging the second current collecting member between the electrode terminal and the second tab, and connecting the electrode terminal and the second tab by the second current collecting member, electrical connection between the second tab and the electrode terminal is achieved, which is conducive to reducing the difficulty of electrical connection between the second tab and the electrode terminal. In addition, by arranging the first current collecting member at an interval from the second current collecting member, a short circuit phenomenon between the first current collecting member and the second current collecting member can be reduced, which is conducive to reducing the risk when using the battery cell.

In some embodiments, in the thickness direction of the wall portion, the first current collecting member has a third surface facing the wall portion, the third surface being connected to the connecting portion, and the second current collecting member has a fourth surface facing the wall portion, the fourth surface being connected to the electrode terminal; where the third surface is flush with the fourth surface.

In the above technical solution, the third surface of the first current collecting member is set to be a structure flush with the fourth surface of the second current collecting member, on the one hand, it is convenient to assemble the first current collecting member and the second current collecting member, which is conducive to reducing the difficulty of assembling the first current collecting member and the second current collecting member between the wall portion and the electrode assembly; on the other hand, the connecting portion arranged on the first surface of the wall portion is capable of compensating for a gap between the first current collecting member and the wall portion, so that the first current collecting member is capable of being electrically connected to the wall portion, and the contact effect between the first current collecting member and the wall portion is capable of being improved.

In some embodiments, in the thickness direction of the wall portion, the first tab has a fifth surface facing the wall portion, the first current collecting member being connected to the fifth surface, and the second tab has a sixth surface facing the wall portion, the second current collecting member being connected to the sixth surface; where the fifth surface is flush with the sixth surface.

In the above technical solution, the fifth surface of the first tab facing the wall portion and the sixth surface of the second tab facing the wall portion are set to be structures flush with each other, on the one hand, it is convenient to process the first tab and the second tab, and on the other hand, it is capable of achieving that the first current collecting member and the second current collecting member are structures flush with each other on the side facing the electrode assembly in the thickness direction of the wall portion, so as to reduce a position difference between the first current collecting member and the second current collecting member in the thickness direction of the wall portion, thereby being conducive to reducing the difficulty of assembling the first current collecting member and the second current collecting member between the electrode assembly and the wall portion, and conducive to improving the internal space utilization of the battery cell.

In some embodiments, the battery cell further includes a first insulating member, the first insulating member is arranged between the electrode assembly and the wall portion, and the first insulating member insulates and isolates the first current collecting member from the second current collecting member.

In the above technical solution, the first insulating member is arranged between the electrode assembly and the wall portion, and the first insulating member is configured to insulate and isolate the first current collecting member from the second current collecting member, thereby being capable of achieving insulation and isolation between the first current collecting member and the second current collecting member, which is conducive to further reducing the risk of short circuit between the first current collecting member and the second current collecting member.

In some embodiments, the first insulating member is provided with a first mounting hole and a second mounting hole arranged at an interval, the first current collecting member is arranged in the first mounting hole, and the second current collecting member is arranged in the second mounting hole.

In the above technical solution, the first mounting hole and the second mounting hole are arranged at an interval on the first insulating member, and the first current collecting member and the second current collecting member are respectively arranged in the first mounting hole and the second mounting hole, on the one hand, the first current collecting member and the second current collecting member are capable of being assembled to the first insulating member, so that the first insulating member is capable of supporting and assembling the first current collecting member and the second current collecting member, which is conducive to reducing the difficulty of arranging the first current collecting member and the second current collecting member between the wall portion and the electrode assembly. On the other hand, the first current collecting member and the second current collecting member are capable of being arranged at an interval on the first insulating member to achieve insulation and isolation between the first current collecting member and the second current collecting member. In some embodiments, the first insulating member includes a first insulator and a second insulator; the first insulator is an annular structure; the second insulator is connected to the first insulator, and the second insulator is configured to separate an internal space of the first insulator into the first mounting hole and the second mounting hole, and the second insulator is located between the first current collecting member and the second current collecting member.

In the above technical solution, the first insulating member is provided with the first insulator of an annular structure and the second insulator connected to an inner side of the first insulator, and the second insulator is configured to separate the internal space of the first insulator into the first mounting hole and the second mounting hole, so that the first insulator and the second insulator jointly define the first mounting hole and the second mounting hole for assembling the first current collecting member and the second current collecting member. The first insulating member with such a structure is capable of, on the one hand, surrounding around outer sides of the first current collecting member and the second current collecting member by the first insulator, so that the first current collecting member and the second current collecting member are capable of being separated from the shell, which is conducive to reducing the risk of short circuit between the first current collecting member and the second current collecting member and the shell; on the other hand, the first current collecting member and the second current collecting member are capable of being separated by the second insulator, which is conducive to reducing the risk of short circuit between the first current collecting member and the second current collecting member.

In some embodiments, the shell is cylindrical, and a central axis of the shell extends in the thickness direction of the wall portion.

In the above technical solution, the shell is set to be cylindrical so as to facilitate processing to form a battery cell with a cylindrical structure, so that the battery cell has advantages such as high capacity, long cycle life, and a wide range of ambient temperature.

In some embodiments, the shell includes a case and an end cover; the case includes a side wall and the wall portion, the side wall encloses a periphery of the wall portion, and in the thickness direction of the wall portion, one end of the side wall is connected to the wall portion, the other end encloses to form an opening, and the side wall and the wall portion together define an accommodating cavity for accommodating the electrode assembly; and the end cover closes the opening.

In the above technical solution, by setting the wall portion of the shell as a bottom wall of the case arranged opposite to the end cover, the wall portion provided with the electrode terminal and configured for electrical connection with the first tab is capable of being kept away from the end cover, thereby being capable of reducing the influence of the stress generated when the end cover and the case are connected to each other on the wall portion or the electrode terminal arranged on the wall portion, which is conducive to improving the reliability and service life of the battery cell.

In some embodiments, the shell includes a case and an end cover; the case is provided with an accommodating cavity having an opening formed therein, and the accommodating cavity is configured to accommodate the electrode assembly; and the end cover closes the opening, where the end cover is the wall portion.

In the above-mentioned technical solution, by setting the wall portion of the shell as the end cover of the shell for closing the opening of the case, the battery cell adopting this structure is conducive to assembling the electrode terminal on the end cover, and it is capable of reducing the difficulties of electrical connections of the first tab and the second tab to the end cover and the electrode terminal, respectively, thereby being conducive to reducing the manufacturing difficulty of the battery cell, so as to improve the production efficiency of the battery cell.

In a second aspect, an embodiment of the present application further provides a battery, including the above-mentioned battery cell.

In a third aspect, an embodiment of the present application further provides an electrical apparatus, including the above-mentioned battery cell, the battery cell being configured to provide electric energy.

DESCRIPTION OF THE DRAWINGS

To more clearly describe the technical solutions of the embodiments of the present application, the drawings to be used in the embodiments will be briefly introduced below, and it should be understood that the following drawings only show some embodiments of the present application, and therefore should not be considered as limiting the scope of the present application. For those of ordinary skills in the art, other relevant drawings may also be obtained based on these drawings without creative efforts.

Figure 1:
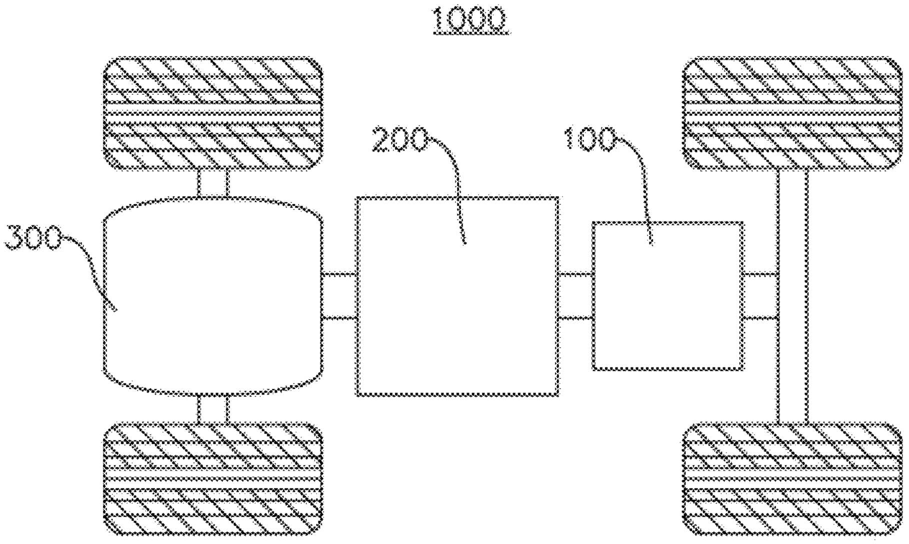
FIG. 1 is a schematic structural diagram of a vehicle according to some embodiments of the present application.

Reference numerals: 1000—Vehicle; 100—Battery; 10—Box; 11—First box body; 12—Second box body; 20—Battery cell; 21—Shell; 211—Wall portion; 2111—First surface; 2112—Connecting portion; 2113—Assembly hole; 2114—Second surface; 2115—Groove; 212—Case; 2121—Opening; 2122—Side wall; 2123—Bottom wall; 213—End cover; 22—Electrode terminal; 23—Electrode assembly; 231—Main body part; 232—First tab; 2321—Fifth surface; 233—Second tab; 2331—Sixth surface; 24—Second insulating member; 25—First current collecting member; 251—Third surface; 26—Second current collecting member; 261—Fourth surface; 27—Pressure relief component; 28—First insulating member; 281—First mounting hole; 282—Second mounting hole; 283—First insulator; 284—Second insulator; 200—Controller; 300—Motor; X—Thickness direction of the wall portion.

DETAILED DESCRIPTION

In order to make the objects, technical solutions, and advantages of embodiments of the present application clearer, the technical solutions in the embodiments of the present application will be clearly described below with reference to the drawings for the embodiments of the present application. Apparently, the described embodiments are some of, rather than all of, the embodiments of the present application. All the other embodiments obtained by a person of ordinary skill in the art based on the embodiments of the present application without any creative effort shall fall within the scope of protection of the present application.

Unless otherwise defined, all technical and scientific terms used in the present application shall have the same meanings as those generally understood by those skilled in the art of the present application. The terms used in the present application in the specification of application are merely for the purpose of describing specific embodiments and are not intended to limit the present application. The terms "include" and "have" and any variations thereof in the specification and claims and the above brief description of the drawings of the present application are intended to cover non-exclusive inclusion. The terms "first", "second", and the like in the specification and the claims of the present application as well as the above drawings are used to distinguish different objects, rather than to describe a specific order or primary-secondary relationship.

The phrase "embodiment" referred to in the present application means that the descriptions of specific features, structures, and characteristics in combination with the embodiment are included in at least one embodiment of the present application. The appearance of this phrase in various places in the specification does not necessarily refer to the same embodiment, nor is it a separate or alternative embodiment that is mutually exclusive with other embodiments.

In the description of the present application, it should be noted that the terms "mounting", "connecting", "connection", and "attachment" should be understood in a broad sense, unless otherwise explicitly specified or defined, for example, it may be a fixed connection, a detachable connection or an integrated connection; and may be a direct connection or an indirect connection through an intermediate medium, or may be a communication between the interior of two elements. For those of ordinary skill in the art, the specific meanings of the above terms in the present application can be understood according to specific situations.

In the present application, the term "and/or" is only an association relation describing associated objects, which means that there may be three relations, for example, A and/or B may represent three situations: A exists alone, both A and B exist, and B exists alone. In addition, the character "/" in the present application generally means that the associated objects before and after it are in an "or" relationship.

In the embodiments of the present application, the same reference numerals denote the same components, and for the sake of brevity, detailed descriptions of the same components are omitted in different embodiments. It should be understood that the thickness, length, width and other dimensions of the various components in the embodiments of the present application shown in the drawings, as well as the overall thickness, length, width and other dimensions of an integrated apparatus, are for illustrative purposes only, and should not constitute any limitation to the present application.

In the present application, the "plurality of" refers to more than two (including two).

In the embodiments of the present application, a battery cell may be a secondary battery. The secondary battery refers to a battery cell that, after being discharged, can activate an active material by charging for continued use.

The battery cell may be a lithium-ion battery, a sodium-ion battery, a sodium/lithium-ion battery, a lithium metal battery, a sodium metal battery, a lithium sulfur battery, a magnesium-ion battery, a nickel hydrogen battery, a nickel cadmium battery, a lead storage battery, and the like. The embodiments of the present application are not limited to this.

The battery cell generally includes an electrode assembly. The electrode assembly includes a positive electrode, a negative electrode, and a spacer. During charging and discharging of the battery cell, active ions (such as lithium ions) are intercalated and deintercalated back and forth between the positive electrode and the negative electrode. The spacer is arranged between the positive electrode and the negative electrode, and can function to prevent short circuit between the positive electrode and the negative electrode and allow the active ions to pass through.

In some embodiments, the positive electrode may be a positive electrode plate, and the positive electrode plate may include a positive electrode current collector and a positive electrode active material arranged on at least one surface of the positive electrode current collector.

As an example, the positive electrode current collector has two surfaces opposite in its own thickness direction, and the positive electrode active material is arranged on either one or both of the two opposite surfaces of the positive electrode current collector.

As an example, the positive electrode current collector may be a metal foil or composite current collector. For example, if it is the metal foil, silver-plated aluminum, silver-plated stainless steel, stainless steel, copper, aluminum, nickel, carbon-fine electrode, carbon, nickel, titanium, or the like can be adopted. The composite current collector may include a high molecular material substrate and a metal layer. The composite current collector may be formed by forming a metal material (such as aluminum, aluminum alloy, nickel, nickel alloy, titanium, titanium alloy, silver, and silver alloy) on a high molecular material substrate (such as a substrate of polypropylene, polyethylene terephthalate, polybutylene terephthalate, polystyrene, or polyethylene).

As an example, the positive electrode active material may include at least one of the following materials: lithium-containing phosphate, lithium transition metal oxide, and respective modified compounds thereof. However, the present application is not limited to these materials, and other conventional materials useful as positive electrode active materials for batteries can also be used. One of these positive active materials may be used alone, or two or more of these positive active materials may be used in combination. Examples of the lithium-containing phosphate may include, but are not limited to, at least one of lithium iron phosphate (e.g., $LiFePO_4$ (also abbreviated as LFP)), lithium iron phosphate-carbon composite, lithium manganese phosphate (e.g., $LiMnPO_4$), lithium manganese phosphate-carbon composite, lithium iron manganese phosphate, and lithium iron manganese phosphate-carbon composite. Examples of the lithium transition metal oxide may include, but are not limited to, at least one of lithium cobalt oxide (e.g., $LiCoO_2$), lithium nickel oxide (e.g., $LiNiO_2$), lithium manganese oxide (e.g., $LiMnO_2$, $LiMn_2O_4$), lithium nickel cobalt oxide, lithium manganese cobalt oxide, lithium nickel manganese oxide, lithium nickel cobalt manganese oxide (e.g., $LiNi_{1/3}Co_{1/3}Mn_{1/3}O_2$ (also abbreviated as $NCM_{333}$), $LiNi_{0.5}Co_{0.2}Mn_{0.3}O_2$ (also abbreviated as $NCM_{523}$), $LiNi_{0.5}Co_{0.25}Mn_{0.25}O_2$ (also abbreviated as $NCM_{211}$), $LiNi_{0.6}Co_{0.2}Mn_{0.2}O_2$ (also abbreviated as $NCM_{622}$), and $LiNi_{0.8}Co_{0.1}Mn_{0.1}O_2$ (also abbreviated as $NCM_{811}$)), lithium nickel cobalt aluminum oxide (e.g., $LiNi_{0.85}Co_{0.15}Al_{0.05}O_2$), and a modified compound thereof, and the like.

In some embodiments, a foam metal may be used as the positive electrode. The foam metal may be foam nickel, foam copper, foam aluminum, foam alloy, foam carbon, or the like. When the foam metal is used as the positive electrode, the surface of the foam metal may not be provided with a positive electrode active material, and of course, may also be provided with a positive electrode active material. For example, a lithium source material, a potassium metal, or a sodium metal may also fill or/and be deposited in the foam metal, and the lithium source material is a lithium metal and/or a lithium-rich material.

In some embodiments, the negative electrode may be a negative electrode plate, and the negative electrode plate may include a negative electrode current collector.

For example, a metal foil, a foam metal, or a composite current collector may be used as the negative electrode current collector. For example, as the metal foil, silver surface-treated aluminum or stainless steel, stainless steel, copper, aluminum, nickel, baked carbon, carbon, nickel, titanium, or the like can be used. The foam metal may be foam nickel, foam copper, foam aluminum, foam alloy, foam carbon, or the like. The composite current collector may include a high molecular material substrate and a metal layer. The composite current collector may be formed by forming a metal material (such as copper, copper alloy, nickel, nickel alloy, titanium, titanium alloy, silver, and silver alloy) on a polymer material substrate (such as a substrate of polypropylene, polyethylene terephthalate, polybutylene terephthalate, polystyrene, or polyethylene).

For example, the negative electrode plate may include a negative electrode current collector and a negative active material arranged on at least one surface of the negative electrode current collector.

For example, the negative electrode current collector has two surfaces opposite to each other in its own thickness direction, and the negative active material is arranged on either one or both of the two opposite surfaces of the negative electrode current collector.

For example, the negative active material for the battery cell that is commonly known in this field can be used as the negative active material. For example, the negative active material may include at least one of the following materials: artificial graphite, natural graphite, soft carbon, hard carbon, a silicon-based material, a tin-based material, lithium titanate, and the like. The silicon-based material may be selected from at least one of elemental silicon, silicon-oxygen compound, silicon-carbon complex, silicon-nitrogen complex, and silicon alloy. The tin-based material may be selected from at least one of elemental tin, tin-oxygen compound, and tin alloy. However, the present application is not limited to these materials, and other conventional materials useful as negative electrode active materials for batteries can also be used. One of these negative active materials may be used alone, or two or more of these negative active materials may be used in combination.

In some embodiments, the material of the positive electrode current collector may be aluminum, and the material of the negative electrode current collector may be copper.

In some implementations, the electrode assembly further includes a spacer, and the spacer is arranged between the positive electrode and the negative electrode.

In some implementations, the spacer is a separator. There may be various types of separators, and any well-known separator with a porous structure having good chemical stability and mechanical stability may be selected.

As an example, the material of the separator may include at least one of glass fiber, non-woven fabric, polyethylene, polypropylene, and polyvinylidene fluoride. The separator may be a single-layer film or a multi-layer composite film. When the separator is the multi-layer composite film, the materials of all layers may be the same or different. The spacer can be an independent component positioned between the positive electrode and the negative electrode, and can also be attached to the surfaces of the positive electrode and the negative electrode.

In some embodiments, the spacer is a solid electrolyte. The solid electrolyte is arranged between the positive electrode and the negative electrode and plays a role of transmitting ions and isolates the positive electrode from the negative electrode.

In some embodiments, the battery cell further includes an electrolyte, and the electrolyte plays a role in conducting ions between the positive electrode and the negative electrode. The electrolyte may be liquid, gel, or solid. The liquid electrolyte includes electrolyte salt and a solvent.

In some embodiments, the electrolyte salt may include at least one of lithium hexafluorophosphate, lithium tetrafluoroborate, lithium perchlorate, lithium hexafluoroarsenate, lithium bis(fluorosulfonyl)imide, lithium bis(trifluoromethanesulfonyl)imide, lithium trifluoromethanesulfonate, lithium difluorophosphate, lithium difluoroborate, lithium bis(oxalate) borate, lithium difluorooxalate phosphate and lithium tetrafluoroborate.

In some implementations, the solvent may include at least one of ethylene carbonate, propylene carbonate, methyl ethyl carbonate, diethyl carbonate, dimethyl carbonate, dipropyl carbonate, methyl propyl carbonate, ethyl propyl carbonate, butyl carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, tetramethylene sulfone, dimethyl sulfone, methyl ethyl sulfone, and ethyl sulfone. The solvent can be ether solvents. The ether solvent may include one or more selected from the group consisting of ethylene glycol dimethyl ether, ethylene glycol diethyl ether, diethylene glycol dimethyl ether, tridiethylene glycol dimethyl ether, tetraethylene glycol dimethyl ether, 1,3-dioxolane, tetrahydrofuran, methyltetrahydrofuran, diphenyl ether, or crown ether.

The gel electrolyte includes a skeleton network with a polymer as the electrolyte, paired with an ionic liquid-lithium salt.

The solid electrolyte includes a polymer solid electrolyte, an inorganic solid electrolyte, and a composite solid electrolyte.

As an example, the polymer solid electrolyte can be polyether (polyoxyethylene), polysiloxane, polycarbonate, polyacrylonitrile, polyvinylidene fluoride, polymethyl methacrylate, a single-ion polymer, a polyionic liquid-lithium salt, cellulose and the like.

As an example, the inorganic solid electrolyte may include one or more of an oxide solid electrolyte (crystalline perovskite, a sodium superconducting ion conductor, garnet and an amorphous LiPON film), a sulfide solid electrolyte (a crystalline lithium superconducting ion conductor (lithium germanium phosphorus sulfur and sulfur silver germanium ore), and amorphous sulfide), a halide solid electrolyte, a nitride solid electrolyte, and a hydride solid electrolyte.

As an example, the composite solid electrolyte is formed by adding an inorganic solid electrolyte filler into the polymer solid electrolyte.

In some implementations, the electrode assembly is of a wound structure. The positive electrode plate and the negative electrode plate are wound into the wound structure.

In some embodiments, the shape of the electrode assembly may be cylindrical.

In some embodiments, the electrode assembly is provided with a tab. The tab may conduct current out from the electrode assembly. The tab includes a positive tab and a negative tab.

In some implementations, the battery cell may include a shell. The shell is configured to encapsulate components such as the electrode assembly and the electrolyte. The shell may be a steel shell, an aluminum shell, a plastic shell (such as polypropylene), a composite metal shell (such as a copper-aluminum composite shell), an aluminum-plastic film, or the like.

As an example, the battery cell may be a cylindrical battery cell, a prismatic battery cell, a pouch cell, or a battery cell in another shape.

A battery mentioned in the embodiments of the present application is a single physical module including one or a plurality of battery cells to provide a higher voltage and capacity.

In some embodiments, the battery may be a battery module. When there are a plurality of battery cells, the plurality of battery cells are arranged and fixed to form a battery module.

In some embodiments, the battery may be a battery pack. The battery pack includes a box body and a battery cell. The battery cell or the battery module is accommodated in the box body.

In some embodiments, the box body may be a part of a vehicle chassis structure. For example, a part of the box body may become at least a part of a vehicle floor, or a part of the box body may become at least a part of a cross beam and a longitudinal beam of a vehicle.

In some embodiments, the battery may be an energy storage apparatus. The energy storage apparatus includes an energy storage container, an energy storage cabinet, or the like.

The battery has outstanding advantages such as high energy density, low environmental pollution, high power density, long service life, wide adaptability, and low self-discharge coefficient, thus being an important component of today's new energy development. In the development of battery technologies, it is needed to consider design factors in many aspects at the same time, such as energy density, cycle life, discharge capacity, charge-discharge rate, and other performance parameters, in addition, it is also necessary to consider the safety and production efficiency of batteries.

For a general battery cell, the battery cell usually includes a shell and an electrode assembly accommodated in the shell. The shell includes an end cover and an integrally formed case, and the end cover covers one end of the case. The electrode assembly is usually provided with a main body part and positive and negative tabs. The positive and negative tabs are configured to output or input electrical energy of the electrode assembly. In order to save the space occupied by the electrode assembly in the shell and to improve the energy density of the battery cell, especially in a battery cell of a cylindrical structure, in the related art, the positive and negative tabs of the electrode assembly are usually arranged at the same end of the main body part, and the electrode terminal is mounted on the end cover in an insulated manner. Two current collecting members are arranged in the shell, one current collecting member connects the end cover and one tab of the electrode assembly, and the other current collecting member connects the electrode terminal and the other tab of the electrode assembly, so as to output or input the positive and negative electrodes of the battery cell respectively through the end cover and the electrode terminal, thereby realizing the electrode assembly being a structure in which tabs are located on the same side, so as to save the space occupied by the electrode assembly in the shell. However, in the battery cell of this structure, since the electrode terminal protrudes from one side of the end cover facing the electrode assembly, in order to compensate for a height difference between the side of the end cover facing the electrode assembly and the electrode terminal, the current collecting member connecting the end cover and the tab of the electrode assembly is usually set to a special-shaped structure, for example, in a "Z" shape, so that the tab is welded to the end cover through the current collecting member. However, it is difficult to assemble the current collecting member of this structure into the shell, and a supporting member needs to be arranged under the current collecting member to ensure that the current collecting member can be in contact with the end cover for welding. The structure is relatively complex and not easy to assemble, so that there is a large difficulty for the battery cell in an assembling process and it is not conducive to improving the production efficiency of the battery cell.

Based on the above-mentioned considerations, in order to solve the problem of the large difficulty in the assembling process of the battery cell, an embodiment of the present application provides a battery cell, and the battery cell includes a shell, an electrode terminal, and an electrode assembly. The shell has a wall portion, and the electrode terminal is mounted on the wall portion in an insulated manner. The electrode assembly is accommodated in the shell, and the electrode assembly includes a main body part, a first tab, and a second tab. The first tab and the second tab have opposite polarities. In a thickness direction of the wall portion, the first tab and the second tab are both arranged at one end of the main body part facing the wall portion. In the thickness direction of the wall portion, the wall portion has a first surface facing the electrode assembly, a connecting portion is arranged to protrude from the first surface, the connecting portion is electrically connected to the first tab, and the electrode terminal is electrically connected to the second tab.

In the battery cell of this structure, by arranging the first tab and the second tab of the electrode assembly at the same end of the main body part facing the wall portion in the thickness direction of the wall portion, it is beneficial to save the space occupied by the electrode assembly, so as to improve the energy density of the battery cell. The connecting portion is arranged to protrude from the first surface of the wall portion, and the connecting portion is configured to be electrically connected to the first tab, on the one hand, it is convenient for the wall portion to be electrically connected to the first tab through the connecting portion, which is conducive to optimizing the height of the first tab protruding from the main body part, and is conducive to improving the contact effect between the connecting portion and the first tab, thereby being capable of effectively improving the electrical connection effect between the wall portion and the first tab. On the other hand, it is capable of reducing the difficulty of electrical connection between the first tab and the wall portion, and there is no need to arrange a component of a special-shaped structure connecting the wall portion and the first tab between the wall portion and the first tab, so that the difficulty of assembling the battery cell is reduced, thereby effectively improving the production efficiency of the battery cell.

The battery cell disclosed in the embodiments of the present application can be used, but is not limited to, in an electrical apparatus, such as a vehicle, a ship, or an aircraft. A power source system of the electrical apparatus may be formed by the battery cell disclosed in the present application, a battery, and the like, which is conducive to alleviating the phenomenon of an excessively large difficulty in the assembling process of the battery cell, so as to improve the production efficiency of the battery cell.

An embodiment of the present application provides an electrical apparatus in which a battery is used as a power source. The electrical apparatus may be, but is not limited to, a mobile phone, a tablet, a laptop computer, an electric toy, an electric tool, a storage battery car, an electric vehicle, a ship, a spacecraft, and the like. The electric toy may include a fixed or mobile electric toy, such as a game console, an electric car toy, an electric ship toy, an electric airplane toy, and the like. The spacecraft may include an airplane, a rocket, a space shuttle, a spaceship, and the like.

For the convenience of description in the following embodiments, an electrical apparatus being a vehicle according to an embodiment of the present application is taken as an example for the description.

Referring to FIG. 1, FIG. 1 is a schematic structural diagram of a vehicle 1000 according to some embodiments of the present application. The vehicle 1000 may be a fuel vehicle, a gas vehicle, or a new energy vehicle. The new energy vehicle may be an all-electric vehicle, a hybrid vehicle, an extended-range vehicle, or the like. A battery 100 is provided in the vehicle 1000. The battery 100 may be arranged at the bottom of the vehicle 1000, or the head of the vehicle 1000, or the tail of the vehicle 1000. The battery 100 may be used for supplying power to the vehicle 1000. For example, the battery 100 may be used as an operating power source or usage power source for the vehicle 1000. The vehicle 1000 may further include a controller 200 and a motor 300. The controller 200 is used for controlling the battery 100 to supply power to the motor 300, for example, to satisfy the operating power demand when the vehicle 1000 is starting, navigating, and traveling.

In some embodiments of the present application, the battery 100 can not only be used as the operating power source or usage power source for the vehicle 1000, but also as the driving power source for the vehicle 1000, to replace or partially replace fuel or natural gas to provide driving power for the vehicle 1000.

Figure 2:
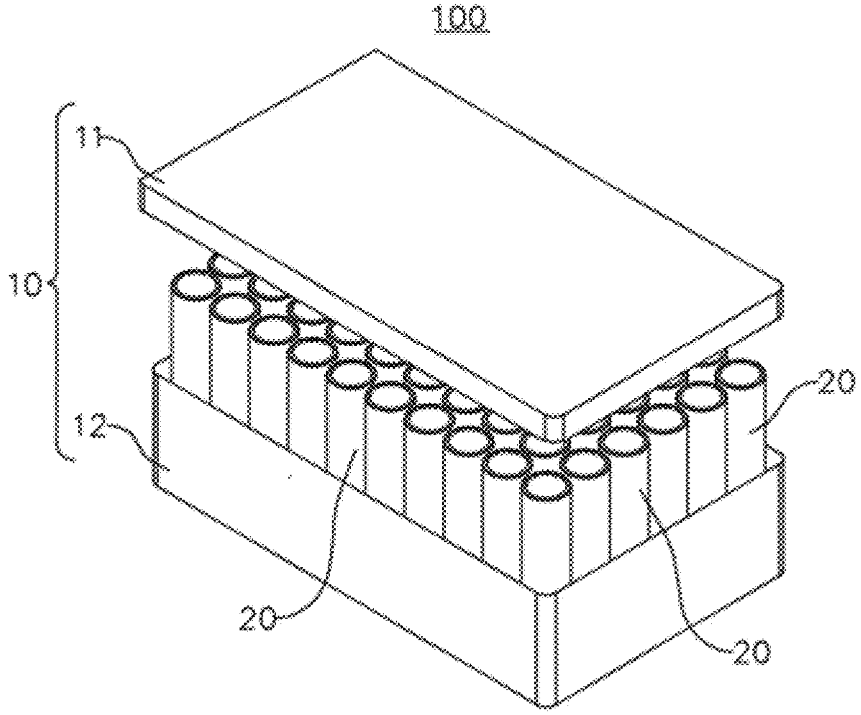
FIG. 2 is an exploded structural diagram of a battery according to some embodiments of the present application.
Figure 3:
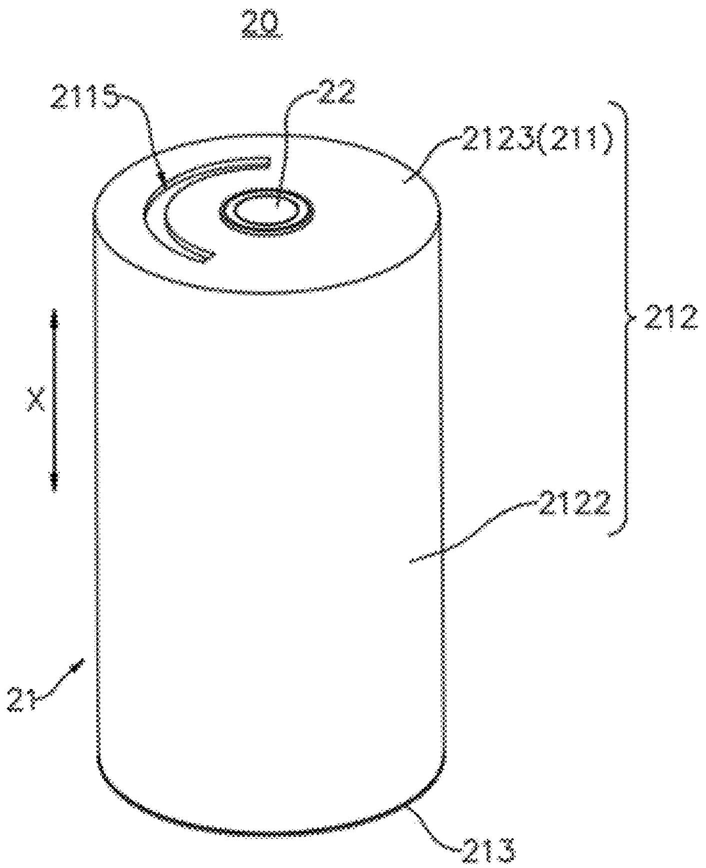
FIG. 3 is a schematic structural diagram of a battery cell according to some embodiments of the present application.

Referring to FIG. 2 and FIG. 3, FIG. 2 is an exploded structural diagram of a battery 100 according to some embodiments of the present application, and FIG. 3 is a schematic structural diagram of a battery cell 20 according to some embodiments of the present application. The battery 100 includes a box 10 and a battery cell 20. The battery cell 20 is configured to be accommodated in the box 10.

The box 10 is configured to provide an assembling space for the battery cell 20, and the box 10 may be of a variety of structures. In some embodiments, the box 10 includes a first box body 11 and a second box body 12. The first box body 11 and the second box body 12 cover each other, and the first box body 11 and the second box body 12 together define an assembling space for accommodating the battery cell 20. The second box body 12 may be of a hollow structure with one end open, the first box body 11 may be of a plate-like structure, and the first box body 11 covers the opening side of the second box body 12, so that the first box body 11 and the second box body 12 together define the assembling space. Both of the first box body 11 and the second box body 12 may also be of a hollow structure with one side open, and the opening side of the first box body 11 covers the opening side of the second box body 12.

Of course, the box 10 formed by the first box body 11 and the second box body 12 may be in a variety of shapes, such as a cylinder, a rectangular solid, a cuboid, or the like. For example, in FIG. 2, the box 10 is in a rectangular solid shape.

In the battery 100, there may be one or a plurality of battery cells 20 arranged in the box 10. If a plurality of battery cells 10 are arranged in the box 20, the plurality of battery cells 20 may be connected in series, in parallel, or in parallel-series, where the parallel-series connection means that the plurality of battery cells 20 are connected both in series and in parallel. The plurality of battery cells 20 may be directly connected in series, in parallel, or in parallel-series, and then the entirety formed by the plurality of battery cells 20 is accommodated in the box 10. Of course, the battery 100 may also be an entirety formed by connecting the plurality of battery cells 20 in series, in parallel, or in parallel-series to form battery modules and then connecting the plurality of battery modules in series, in parallel, or in parallel-series, and the entirety is then accommodated in the box 10.

In some embodiments, the battery 100 may further include other structures. For example, the battery 100 may further include a busbar component, and the busbar component is configured to connect the plurality of battery cells 20 so as to realize the electrical connections between the plurality of battery cells 20.

Figure 4:
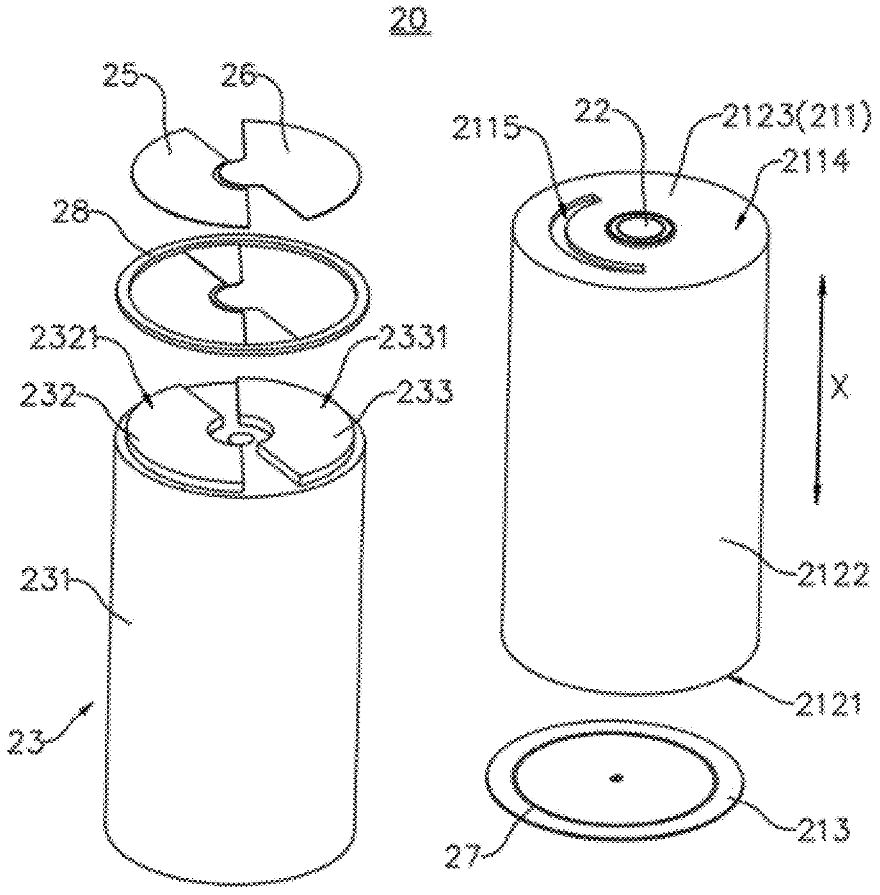
FIG. 4 is an exploded structural diagram of a battery cell according to some embodiments of the present application.
Figure 5:
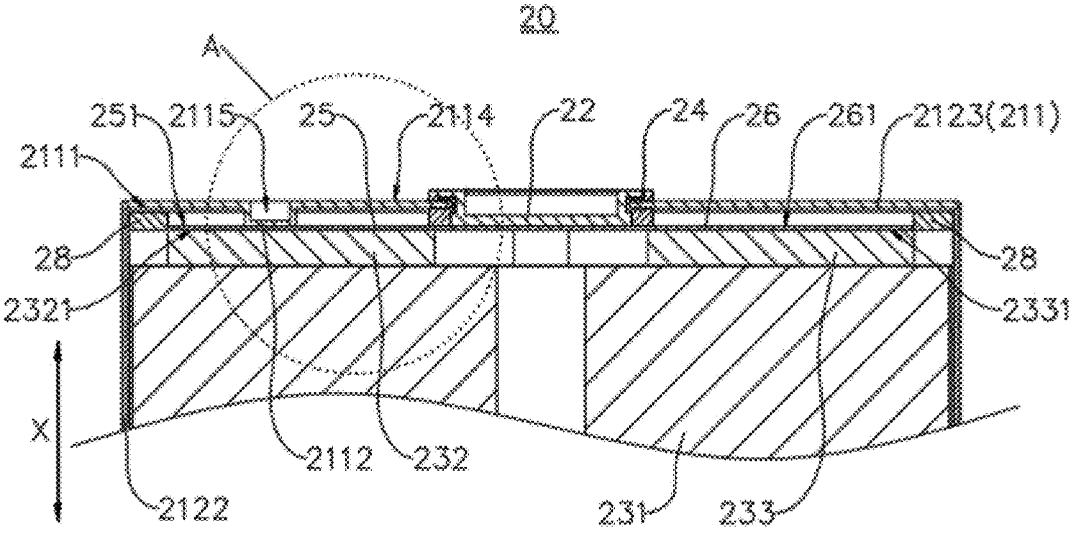
FIG. 5 is a partial sectional diagram of a battery cell according to some embodiments of the present application.
Figure 6:
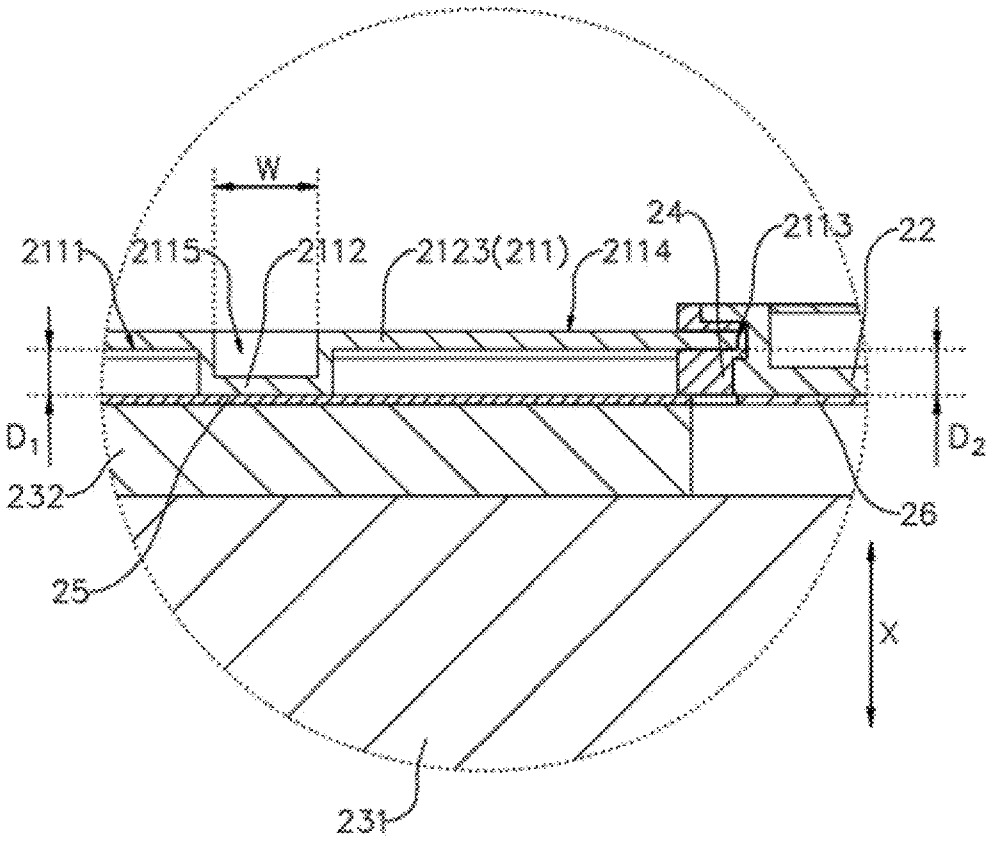
FIG. 6 is a partial enlarged diagram of A in the battery cell shown in FIG. 5.

Each of the battery cells 20 may be a secondary battery or a primary battery; or it may be a lithium-sulfur battery, a sodium-ion battery, or a magnesium-ion battery, but is not limited thereto. The battery cell 20 may be in a cylindrical-shape, a prismatic-shape, another shape, or the like. For example, in FIG. 3, the battery cell 20 is of a cylindrical structure.

according to some embodiments of the present application, referring to FIG. 3, and further referring to FIG. 4, FIG. 5, and FIG. 6, FIG. 4 is an exploded structural diagram of a battery cell 20 according to some embodiments of the present application, FIG. 5 is a partial sectional diagram of a battery cell 20 according to some embodiments of the present application, and FIG. 6 is a partial enlarged diagram of A in the battery cell 20 shown in FIG. 5. The present application provides a battery cell 20, and the battery cell 20 includes a shell 21, an electrode terminal 22, and an electrode assembly 23. The shell 21 has a wall portion 211, and the electrode terminal 22 is mounted on the wall portion 211 in an insulated manner. The electrode assembly 23 is accommodated in the shell 21, and the electrode assembly 23 includes a main body part 231, a first tab 232, and a second tab 233. The first tab 232 and the second tab 233 have opposite polarities. In a thickness direction X of the wall portion, the first tab 232 and the second tab 233 are both arranged at one end of the main body part 231 facing the wall portion 211. In the thickness direction X of the wall portion, the wall portion 211 has a first surface 2111 facing the electrode assembly 23, a connecting portion 2112 is arranged to protrude from the first surface 2111, the connecting portion 2112 is electrically connected to the first tab 232, and the electrode terminal 22 is electrically connected to the second tab 233.

The shell 21 may further be configured to accommodate an electrolyte, such as electrolyte solution. The shell 21 may be made of various materials, such as copper, iron, aluminum, steel, aluminum alloy, or the like.

In some embodiments, the shell 21 may include a case 212 and an end cover 213. The case 212 is provided with an accommodating cavity therein, the accommodating cavity is configured to accommodate the electrode assembly 23, and the accommodating cavity has an opening 2121. In other words, the case 212 is of a hollow structure having the opening 2121 at one end, and the end cover 213 covers the opening 2121 of the case 212 and forms a sealed connection to form a sealed space for accommodating the electrode assembly 23 and the electrolyte solution.

When the battery cell 20 is assembled, the electrode assembly 23 may be placed in the case 212 first, the case 212 is filled with the electrolyte solution, and then the opening 2121 of the case 212 is covered by the end cover 213, so as to complete the assembling of the battery cell 20.

The case 212 may have a variety of shapes, such as a cylindrical or prismatic structure. The shape of the case 212 may be determined according to the specific shape of the electrode assembly 23. For example, if the electrode assembly 23 is of a cylindrical structure, the case 212 of a cylindrical structure may be selected. Of course, the end cover 213 may have various structures. For example, the end cover 213 may be a plate-like structure or a hollow structure with one end open. For example, in FIG. 4, the case 212 is of a cylindrical structure, a central axis of the case 212 extends in the thickness direction X of the wall portion, and the end cover 213 is a plate-like structure.

It should be noted that the wall portion 211 for mounting the electrode terminal 22 and provided with the connecting portion 2112 may be the end cover 213 of the shell 21, or may be a wall of the case 212. For example, in FIG. 3 and FIG. 4, the case 212 may include a side wall 2122 and a bottom wall 2123, the side wall 2122 is arranged around the bottom wall 2123, and in the thickness direction X of the wall portion, the bottom wall 2123 is arranged opposite to the end cover 213, one end of the side wall 2122 is connected to the bottom wall 2123, and the other end encloses to form the opening 2121, and the bottom wall 2123 is used to mount the electrode terminal 22 and the wall portion 211 provided with the connecting portion 2112. Of course, the structure of the battery cell 20 is not limited thereto. In other embodiments, the wall portion 211 may also be the end cover 213 of the shell 21.

Optionally, the side wall 2122 and the bottom wall 2123 of the case 212 may be an integrally formed structure, for example, formed by a stamping or casting process. Of course, the side wall 2122 and the bottom wall 2123 of the case 212 may also be separated structures, that is, the side wall 2122 and the bottom wall 2123 are separately arranged, and the bottom wall 2123 may be connected to the side wall 2122 by welding, bonding, or other methods.

For example, in FIG. 4, the side wall 2122 and the bottom wall 2123 are an integrally formed structure.

It should be noted that in the embodiment where the side wall 2122 and the bottom wall 2123 are separately arranged, the end cover 213 and the side wall 2122 may be an integrally formed structure or separately arranged structures. For example, in FIG. 4, the end cover 213 and the side wall 2122 are separately arranged structures, and the end cover 213 is welded to one end of the side wall 2122 away from the bottom wall 2123 in the thickness direction X of the wall portion.

The electrode assembly 23 is a component in the battery cell 20 where electrochemical reactions occur. The structure of the electrode assembly 23 may be varied. For example, in FIG. 4, the electrode assembly 23 is a wound structure formed by winding a positive electrode plate, a spacer, and a negative electrode plate, the main body part 231 of the electrode assembly 23 is cylindrical, and the central axis of the main body part 231 extends in the thickness direction X of the wall portion.

For example, the spacer is a separator, and the main material of the separator may be selected from at least one of glass fiber, non-woven fabric, polyethylene, polypropylene, and polyvinylidene fluoride.

The main body part 231 is a region where the electrode assembly 23 undergoes chemical reactions within the battery cell 20. The main body part 231 is a structure formed by winding a region of the positive electrode plate coated with a positive electrode active material layer, the spacer, and a region of the negative electrode plate coated with a negative electrode active material layer. It mainly works relying on metal ions moving between the positive electrode plate and the negative electrode plate having opposite polarities.

The first tab 232 and the second tab 233 are both arranged at one end of the main body part 231 facing the wall portion 211 in the thickness direction X of the wall portion. In other words, the first tab 232 and the second tab 233 are arranged at the same end of the main body part 231 in the thickness direction X of the wall portion and are located at one end of the main body part 231 facing the wall portion 211 in the thickness direction X of the wall portion.

The first tab 232 and the second tab 233 are configured to output or input the positive and negative electrodes of the electrode assembly 23, respectively. If the first tab 232 is configured to input or output the positive electrode of the electrode assembly 23, and the first tab 232 is a component formed by mutually stacking and connecting the regions on the positive electrode plate that are not coated with the positive electrode active material layer. Correspondingly, the second tab 233 is configured to output or input the negative electrode of the electrode assembly 23, and the second tab 233 is a component formed by mutually stacking and connecting the regions on the negative electrode plate that are not coated with the negative electrode active material layer. If the first tab 232 is configured to output or input the negative electrode of the electrode assembly 23, the first tab 232 is a component formed by mutually stacking and connecting the regions on the negative electrode plate that are not coated with the negative electrode active material layer. Correspondingly, the second tab 233 is configured to input or output the positive electrode of the electrode assembly 23, and the second tab 233 is a component formed by mutually stacking and connecting the regions on the positive electrode plate that are not coated with the positive electrode active material layer. For example, in the embodiment of the present application, the first tab 232 is configured to output or input the negative electrode of the electrode assembly 23, and the second tab 233 is configured to output or input the positive electrode of the electrode assembly 23.

The electrode terminal 22 functions to input or output electric energy of the battery cell 20, and may be made of various materials, such as copper, iron, aluminum, steel, aluminum alloy, or the like.

The electrode terminal 22 is mounted on the wall portion 211 in an insulated manner, that is, no electrical connection is formed between the electrode terminal 22 and the wall portion 211. In some embodiments, referring to FIG. 5 and FIG. 6, an assembly hole 2113 is provided on the wall portion 211, and the assembly hole 2113 penetrates through both sides of the wall portion 211 in the thickness direction X of the wall portion. The electrode terminal 22 is passed through the assembly hole 2113, and both ends of the electrode terminal 22 in the thickness direction X of the wall portion extend out of the assembly holes 2113 respectively, so that the two ends of the electrode terminal 22 in the thickness direction X of the wall portion protrude from both sides of the wall portion 211 respectively, and therefore, one end of the electrode terminal 22 facing the electrode assembly 23 in the thickness direction X of the wall portion is capable of being electrically connected to the second tab 233, and the other end is capable of being electrically connected to the busbar component of the battery 100.

The battery cell 20 may further include a second insulating member 24, and the second insulating member 24 is arranged between the wall portion 211 and the electrode terminal 22 to insulate and isolate the wall portion 211 from the electrode terminal 22, thereby achieving an insulated mounting of the electrode terminal 22 on the wall portion 211.

For example, the second insulating member 24 may be made of rubber, plastic, silicone, or the like.

In FIG. 6, in the thickness direction X of the wall portion, the wall portion 211 has a first surface 2111 facing the electrode assembly 23, and the electrode terminal 22 protrudes from the first surface 2111. In other words, in the thickness direction X of the wall portion, one end of the electrode terminal 22 close to the electrode assembly 23 extends out of the surface of the wall portion 211 facing the electrode assembly 23, so that the end face of the electrode terminal 22 facing the electrode assembly 23 is closer to the main body part 231 of the electrode assembly 23 than the first surface 2111.

The connecting portion 2112 is arranged to protrude from the first surface 2111. That is, the connecting portion 2112 is a structure protruded from one side of the wall portion 211 facing the electrode assembly 23, and the connecting portion 2112 is connected to the first surface 2111.

It should be noted that the connecting portion 2112 being electrically connected to the first tab 232 may be that the connecting portion 2112 and the first tab 232 are directly connected, for example, by welding or abutting, to achieve electrical connection between the connecting portion 2112 and the first tab 232, or the connecting portion 2112 may be connected to other another component and then connected to the first tab 232 to achieve electrical connection between the connecting portion 2112 and the first tab 232. Similarly, the electrode terminal 22 being electrically connected to the second tab 233 may be that the electrode terminal 22 and the second tab 233 are directly connected, for example, by welding or abutting, to achieve electrical connection between the electrode terminal 22 and the second tab 233, or the electrode terminal 22 may be connected to another component and then connected to the second tab 233 to achieve electrical connection between the electrode terminal 22 and the second tab 233.

For example, in FIG. 4 and FIG. 5, the battery cell 20 may also include a first current collecting member 25 and a second current collecting member 26. Both of the first current collecting member 25 and the second current collecting member 26 are arranged between the electrode assembly 23 and the wall portion 211, and in the thickness direction X of the wall portion, two sides of the first current collecting member 25 are respectively connected to the connecting portion 2112 and the first tab 232 to achieve electrical connection between the connecting portion 2112 and the first tab 232. Connection structures between the first current collecting member 25 and the connecting portion 2112 and between the first current collecting member 25 and the first tab 232 may be welding, abutment, or the like. Similarly, in the thickness direction X of the wall portion, two sides of the second current collecting member 26 are respectively connected to the electrode terminal 22 and the second tab 233 to achieve electrical connection between the electrode terminal 22 and the second tab 233. Connection structures between the second current collecting member 26 and the electrode terminal 22 and between the second current collecting member 26 and the second tab 233 may be welding, abutment, or the like.

In some embodiments, referring to FIG. 4, the battery cell 20 may further include a pressure relief component 27. The pressure relief component 27 is arranged on the shell 21, and the pressure relief component 27 is configured to relief a pressure in the battery cell 20 when the internal pressure or temperature of the battery cell 20 reaches a predetermined threshold. Optionally, the pressure relief component 27 may be arranged on the end cover 213 of the shell 21, or arranged on the case 212 of the shell 21.

For example, in FIG. 4, the pressure relief component 27 is arranged on the end cover 213. Likewise, the pressure relief component 27 and the shell 21 may be an integrally formed structure or separately arranged structures. For example, in FIG. 4, the pressure relief component 27 and the end cover 213 of the shell 21 are the integrally formed structure, and the pressure relief component 27 is a region on the end cover 213 where a weak structure is formed. For example, the pressure relief component 27 is a region on the end cover 213 where a notch groove is provided. Of course, in other embodiments, the pressure relief component 27 and the end cover 213 may also be separate structures, and the pressure relief component 27 may be connected to the end cover 213 by welding or the like. Correspondingly, the pressure relief component 27 may be components such as an explosion-proof valve, a rupture disk, an air valve, a pressure relief valve, or a safety valve.

By arranging the first tab 232 and the second tab 233 of the electrode assembly 23 at the same end of the main body part 231 facing the wall portion 211 in the thickness direction X of the wall portion, it is beneficial to save the space occupied by the electrode assembly 23, so as to improve the energy density of the battery cell 20. The connecting portion 2112 is arranged to protrude from the first surface 2111 of the wall portion 211, and the connecting portion 2112 is configured to be electrically connected to the first tab 232, on the one hand, it is convenient for the wall portion 211 to be electrically connected to the first tab 232 through the connecting portion 2112, which is conducive to optimizing the height of the first tab 232 protruding from the main body part 231, and is conducive to improving the contact effect between the connecting portion 2112 and the first tab 232, thereby being capable of effectively improving the electrical connection effect between the wall portion 211 and the first tab 232. On the other hand, it is capable of reducing the difficulty of electrical connection between the first tab 232 and the wall portion 211, and there is no need to arrange a component of a special-shaped structure connecting the wall portion 211 and the first tab 232 between the wall portion 211 and the first tab 232, so that the difficulty of assembling the battery cell 20 is reduced, thereby effectively improving the production efficiency of the battery cell 20.

According to some embodiments of the present application, as shown in FIG. 4, FIG. 5, and FIG. 6, in the thickness direction X of the wall portion, the wall portion 211 has a second surface 2114 facing away from the first surface 2111, and a groove 2115 is formed on the second surface 2114 at a position corresponding to the connecting portion 2112.

The groove 2115 arranged on the second surface 2114 of the wall portion 211 is formed by a stamping process, so as to form the connecting portion 2112 on the first surface 2111 of the wall portion 211, and form the groove 2115 on the second surface 2114 of the wall portion 211 facing away from the first surface 2111 at a position corresponding to the connecting portion 2112. Of course, the processing method of arranging the connecting portion 2112 to protrude from the first surface 2111 of the wall portion 211 is not only limited to this. In other embodiments, the connecting portion 2112 protruding from the first surface 2111 of the wall portion 211 may also be formed by a casting process, or the connecting portion 2112 may be connected to the first surface 2111 of the wall portion 211 by a connecting structure such as welding or bonding.

For example, in the thickness direction X of the wall portion, a groove depth of the groove 2115 is equal to the dimension of the connecting portion 2112 protruding from the first surface 2111, so that the thickness of a groove bottom wall 2123 of the groove 2115 is capable of being equal to the thickness of the wall portion 211.

The groove 2115 is formed on the second surface 2114 of the wall portion 211 at the position corresponding to the connecting portion 2112. On the one hand, the connecting portion 2112 of the wall portion 211 is a concave-convex structure that can be formed by stamping, so that the connecting portion 2112 and the groove 2115 are respectively formed on both sides of the wall portion 211, which is convenient for manufacturing and helps reduce the difficulty of processing the connecting portion 2112. On the other hand, the thickness of the connecting portion 2112 is capable of being thinned by the groove 2115 to reduce the difficulty of electrical connection between the connecting portion 2112 and the first tab 232.

According to some embodiments of the present application, still referring to FIG. 4, FIG. 5, and FIG. 6, the battery cell 20 may further include the first current collecting member 25, the first current collecting member 25 is connected to the first tab 232, and the groove bottom wall 2123 of the groove 2115 is welded to the first current collecting member 25 to electrically connect the first tab 232 and the wall portion 211.

In the thickness direction X of the wall portion, the first current collecting member 25 is arranged between the connecting portion 2112 and the first tab 232 of the electrode assembly 23. The first current collecting member 25 serves to connect the first tab 232 and the connecting portion 2112. The first current collecting member 25 may be made of a variety of materials, such as copper, iron, aluminum, steel, or aluminum alloy.

The first current collecting member 25 is connected to the first tab 232, that is, one side of the first current collecting member 25 facing the first tab 232 is connected to the first tab 232, so that the first current collecting member 25 is electrically connected to the first tab 232. The connection structure between the first current collecting member 25 and the first tab 232 may be varied, such as welding or abutment.

The groove bottom wall 2123 of the groove 2115 is welded to the first current collecting member 25, that is, a region of the connecting portion 2112 corresponding to the groove 2115 is welded to the first current collecting member 25, so that the wall portion 211 is capable of being electrically connected to the first current collecting member 25 through the connecting portion 2112. In other words, the region of the connecting portion 2112 thinned by the groove 2115 is welded to the first current collecting member 25.

It should be noted that, in some embodiments, the battery cell 20 may not be provided with the first current collecting member 25. For example, the groove bottom wall 2123 of the groove 2115 is welded to the first tab 232 to electrically connect the first tab 232 and the wall portion 211. In other words, the region of the connecting portion 2112 thinned by the groove 2115 is directly welded to the first tab 232, so that the wall portion 211 is capable of being electrically connected to the first tab 232 through the connecting portion 2112.

By arranging the first current collecting member 25 between the connecting portion 2112 and the first tab 232, the first current collecting member 25 is connected to the first tab 232, so that the groove bottom wall 2123 of the groove 2115 being welded to the first current collecting member 25 is capable of realizing electrical connection between the first tab 232 and the wall portion 211. The battery cell 20 adopting this structure is capable of, on the one hand, improving the connection reliability between the connecting portion 2112 and the first current collecting member 25, so as to improve the stability of the mutual electrical connection between the wall portion 211 and the first tab 232. On the other hand, by welding the groove bottom wall 2123 of the groove 2115 to the first current collecting member 25, the connecting portion 2112 is welded to the first current collecting member 25 in the region thinned by the groove 2115, which is conducive to reducing the difficulty of welding the connecting portion 2112 and the first current collecting member 25 to each other. Similarly, by directly welding the groove bottom wall 2123 of the groove 2115 to the first tab 232 to achieve electrical connection between the wall portion 211 and the first tab 232, the battery cell 20 adopting this structure is capable of, on the one hand, improving the connection reliability between the connecting portion 2112 and the first tab 232 to improve the stability of the electrical connection between the wall portion 211 and the first tab 232. On the other hand, by welding the groove bottom wall 2123 of the groove 2115 to the first tab 232, the connecting portion 2112 is welded to the first tab 232 in the region thinned by the groove 2115, which is conducive to reducing the difficulty of welding the connecting portion 2112 and the first tab 232 to each other.

According to some embodiments of the present application, as shown in FIG. 4 and FIG. 6, a minimum width of the groove 2115 is W, meeting W≥5 mm.

In FIG. 4, the groove 2115 is an arc-shaped groove structure, and the minimum width W of the groove 2115 is a minimum width of a cross section of the groove 2115 in its extension direction.

For example, the minimum width W of the groove 2115 may be 5 mm, 5.5 mm, 5.8 mm, 6 mm, 6.5 mm, 7 mm, 7.5 mm, 8 mm, 8.5 mm, 9 mm, 10 mm, or the like.

By setting the minimum width of the groove 2115 to be greater than or equal to 5 mm, so as to facilitate the welding connection between the groove bottom wall 2123 of the groove 2115 and the first current collecting member 25 or the first tab 232, it is conducive to reducing the difficulty of welding the region of the connecting portion 2112 thinned by the groove 2115 and the first current collecting member 25 or the first tab 232, thereby being capable of effectively alleviating the phenomenon that the width of the groove 2115 is too small to weld the groove bottom wall 2123 of the groove 2115 and the first current collecting member 25 or the first tab 232.

In some embodiments, in the thickness direction X of the wall portion, a projection area of the groove 2115 is $S_1$, a projection area of the wall portion 211 is $S_2$, meeting $0.1S_2 \le S_1 \le 0.5S_2$.

The projection area $S_1$ of the groove 2115 is an area of a region defined by a projection of the groove 2115 in a plane perpendicular to the thickness direction X of the wall portion. The projection area $S_2$ of the wall portion 211 is an area of a region defined by a projection of the entire wall portion 211 in the plane perpendicular to the thickness direction X of the wall portion.

For example, the projection area $S_1$ of the groove 2115 may be 0.1 times, 0.12 times, 0.15 times, 0.18 times, 0.2 times, 0.25 times, 0.3 times, 0.35 times, 0.4 times, 0.45 times, 0.5 times or the like the projection area $S_2$ of the wall portion 211.

By setting the projection area of the groove 2115 in the thickness direction X of the wall portion to be greater than or equal to 0.1 times the projection area of the wall portion 211 in the thickness direction X of the wall portion, the area of the region where the connecting portion 2112 is thinned by the groove 2115 is increased, so that the area of the welding connection between the connecting portion 2112 and the first current collecting member 25 or the first tab 232 is capable of being effectively increased, which is conducive to improving the flow area between the connecting portion 2112 and the first tab 232. In addition, by setting the projection area of the groove 2115 in the thickness direction X of the wall portion to be less than or equal to 0.5 times the projection area of the wall portion 211 in the thickness direction X of the wall portion, the phenomenon of the groove 2115 occupying too much space on the wall portion 211 can be alleviated. On the one hand, it is conducive to improving the structural strength of the wall portion 211 to reduce the risk of deformation or breakage of the wall portion 211 during use. On the other hand, it is capable of alleviating the phenomenon that there is an excessively large protruding portion of the connecting portion 2112 in the region corresponding to the groove 2115 on the first surface 2111 of the wall portion 211, resulting in interference between the connecting portion 2112 and other components inside the battery cell 20.

Figure 7:
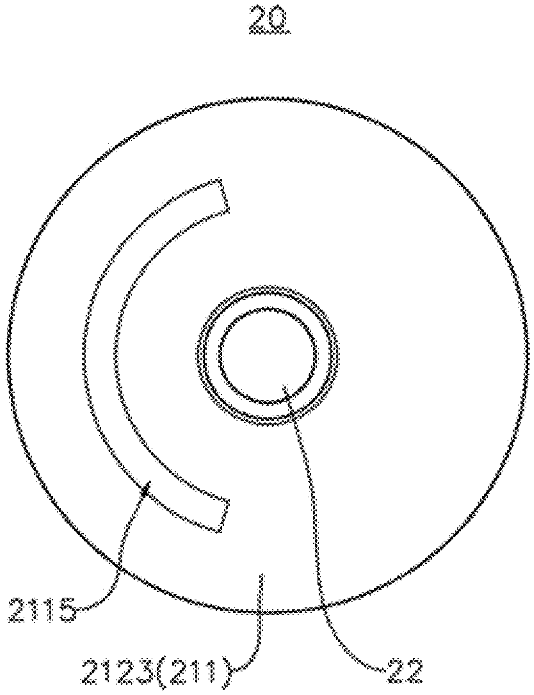
FIG. 7 is a top view of a battery cell according to some embodiments of the present application.

According to some embodiments of the present application, referring to FIG. 3 and FIG. 4 and further referring to FIG. 7, FIG. 7 is a top view of a battery cell 20 according to some embodiments of the present application. The groove 2115 is an arc-shaped groove extending in an arc trajectory.

The groove 2115 is the arc-shaped groove extending in the arc trajectory, that is, the extension direction of the groove 2115 is an arc trajectory line, so that the groove 2115 has an arc-shaped groove structure.

The groove 2115 is set as the arc-shaped groove structure extending in the arc trajectory to facilitate processing and manufacturing, and a range of the region where the groove bottom wall 2123 of the groove 2115 and the first current collecting member 25 or the first tab 232 are welded to each other is capable of being expanded, thereby being capable of effectively improving an electrical connection effect between the wall portion 211 and the first tab 232.

In some embodiments, referring to FIG. 3 and FIG. 7, the shell 21 is cylindrical, a central axis of the shell 21 extends in the thickness direction X of the wall portion, and the central axis of the shell 21 passes through the center of the arc trajectory of the groove 2115.

The central axis of the shell 21 passes through the center of the arc trajectory of the groove 2115, that is, the center of a circle defined by the extended trajectory line of the groove 2115 is located on the central axis of the shell 21, that is, the groove 2115 is the arc-shaped structure arranged around an axis being the central axis of the shell 21.

The shell 21 is set as a cylindrical structure, and the central axis of the shell 21 is a structure extending in the thickness direction X of the wall portion, so that the shape of the wall portion 211 is circular. Therefore, the central axis of the shell 21 is set as the center of the arc trajectory passing through the groove 2115, so that the groove 2115 is an arc-shaped groove structure arranged around the central axis of the shell 21. On the one hand, it is conducive to improving the space utilization of the groove 2115 on the wall portion 211, and on the other hand, it is convenient for manufacturing, and is further capable of expanding the range of the region where the groove bottom wall 2123 of the groove 2115 and the first current collecting member 25 or the first tab 232 are welded to each other, so as to improve the electrical connection effect between the wall portion 211 and the first tab 232.

According to some embodiments of the present application, referring to FIG. 6, in the thickness direction X of the wall portion, the dimension of the connecting portion 2112 protruding from the first surface 2111 is $D_1$, meeting $D_1 \leq 8$ mm.

The dimension of the connecting portion 2112 protruding from the first surface 2111 is $D_1$. In other words, $D_1$ is a distance between the end face of the connecting portion 2112 facing the electrode assembly 23 in the thickness direction X of the wall portion and the first surface 2111.

For example, the dimension $D_1$ of the connecting portion 2112 protruding from the first surface 2111 may be 0.1 mm, 0.2 mm, 0.5 mm, 0.8 mm, 1 mm, 1.2 mm, 1.5 mm, 2 mm, 2.5 mm, 3 mm, 3.5 mm, 4 mm, 4.5 mm, 5 mm, 5.5 mm, 6 mm, 6.5 mm, 7 mm, 7.5 mm, 8 mm, or the like.

By setting the dimension of the connecting portion 2112 protruding from the first surface 2111 to be less than or equal to 8 mm, on the one hand, the phenomenon of excessive space occupied by the connecting portion 2112 is capable of being reduced, which is conducive to improving the internal space utilization of the battery cell 20; on the other hand, the interference influence of the connecting portion 2112 on the electrical connection between the electrode terminal 22 and the second tab 233 is capable of being reduced.

Figure 8:
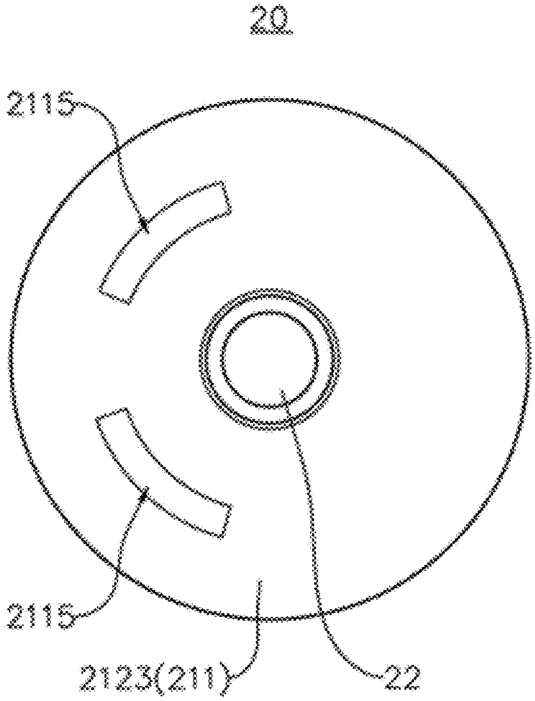
FIG. 8 is a top view of a battery cell according to other embodiments of the present application.

It should be noted that there may be one or a plurality of connecting portions 2112 arranged on the first surface 2111 of the wall portion 211. For example, in FIG. 6 and FIG. 7, only one connecting portion 2112 is arranged to protrude from the first surface 2111, and correspondingly, one groove 2115 with the same shape as the connecting portion 2112 is correspondingly formed on the second surface 2114. Of course, the structure of the battery cell 20 is not limited thereto. In some embodiments, referring to FIG. 8, FIG. 8 is a top view of a battery cell 20 according to other embodiments of the present application. A plurality of connecting portions 2112 are arranged to protrude from the first surface 2111. Correspondingly, a plurality of grooves 2115 having the same shape as the connecting portion 2112 are formed on the second surface 2114.

For example, in FIG. 8, two grooves 2115 are formed on the second surface 2114 of the wall portion 211, and the two grooves 2115 are arranged at an interval along the arc trajectory with the central axis of the shell 21 as the center. Correspondingly, two connecting portions 2112 are arranged to protrude from the first surface 2111.

By arranging the plurality of connecting portions 2112 to protrude from the first surface 2111 of the wall portion 211, the wall portion 211 is capable of being electrically connected to the first tab 232 through the plurality of connecting portions 2112, which is conducive to improving the effect of the mutual electrical connection between the wall portion 211 and the first tab 232, and is capable of increasing the flow area between the wall portion 211 and the first tab 232.

According to some embodiments of the present application, referring to FIG. 5 and FIG. 6, the wall portion 211 is provided with an assembly hole 2113, and the assembly hole 2113 penetrates the wall portion 211 in the thickness direction X of the wall portion. The electrode terminal 22 is arranged in the assembly hole 2113 and protrudes from the first surface 2111.

The electrode terminal 22 is inserted into the assembly hole 2113 of the wall portion 211, and the electrode terminal 22 protrudes from the first surface 2111. In other words, in the thickness direction X of the wall portion, one end of the electrode terminal 22 close to the electrode assembly 23 extends out of the assembly hole 2113 and exceeds the first surface 2111, so that the end face of the electrode terminal 22 facing the electrode assembly 23 is arranged at an interval from the first surface 2111.

The electrode terminal 22 is a structure arranged to protrude from the first surface 2111 in the thickness direction X of the wall portion, so as to facilitate electrical connection between the electrode terminal 22 and the second tab 233, which helps reduce the difficulty of electrical connection between the electrode terminal 22 and the second tab 233. Moreover, a height difference between the end face of the electrode terminal 22 facing the electrode assembly 23 and the first surface 2111 of the wall portion 211 is capable of being compensated by the connecting portion 2112 protruding from the first surface 2111 of the wall portion 211, thereby effectively improving the electrical connection effect between the electrode terminal 22 and the second tab 233 while realizing electrical connection between the wall portion 211 and the first tab 232.

In some embodiments, referring to FIG. 6, in the thickness direction X of the wall portion, the dimension of the connecting portion 2112 protruding from the first surface 2111 is $D_1$, and the dimension of the electrode terminal 22 protruding from the first surface 2111 is $D_2$, meeting $D_1=D_2$.

$D_1=D_2$ refers to that the height of the connecting portion 2112 protruding from the first surface 2111 is equal to the height of the electrode terminal 22 protruding from the first surface 2111, so that in the thickness direction X of the wall portion, the end face of the connecting portion 2112 facing the electrode assembly 23 is flush with the end face of the electrode terminal 22 facing the electrode assembly 23.

By setting the dimension of the connecting portion 2112 protruding from the first surface 2111 to be the same as the dimension of the electrode terminal 22 protruding from the first surface 2111, the end face of the connecting portion 2112 facing the electrode assembly 23 and the end face of the electrode terminal 22 facing the electrode assembly 23 are structures flush with each other in the thickness direction X of the wall portion. On the one hand, the difficulties of electrical connections between the connecting portion 2112 and the first tab 232 and between the electrode terminal 22 and the second tab 233 are capable of being reduced. On the other hand, a poor electrical connection effect between the connecting portion 2112 and the first tab 232 or between the electrode terminal 22 and the second tab 233 due to mutual influence between the connecting portion 2112 and the electrode terminal 22 is capable of being reduced.

According to some embodiments of the present application, referring to FIG. 4, FIG. 5, and FIG. 6, the battery cell 20 may further include the first current collecting member 25 and the second current collecting member 26. The first current collecting member 25 is located between the connecting portion 2112 and the first tab 232, and the first current collecting member 25 connects the connecting portion 2112 and the first tab 232. The second current collecting member 26 is located between the electrode terminal 22 and the second tab 233, the second current collecting member 26 and the first current collecting member 25 are arranged at an interval, and the second current collecting member 26 connects the electrode terminal 22 and the second tab 233.

The first current collecting member 25 is arranged between the connecting portion 2112 and the first tab 232 in the thickness direction X of the wall portion, and two sides of the first current collecting member 25 are respectively connected to the connecting portion 2112 and the first tab 232 to achieve electrical connection between the first tab 232 and the wall portion 211.

Optionally, the connection structure between the first current collecting member 25 and the first tab 232 may be varied, such as welding or abutment. Likewise, the connection structure between the first current collecting member 25 and the connecting portion 2112 may also be varied, such as welding or abutment.

The first current collecting member 25 functions to electrically connect the first tab 232 and the connecting portion 2112 of the wall portion 211. The first current collecting member 25 may be made of various materials, for example, the material of the first current collecting member 25 may be copper, iron, aluminum, steel, aluminum alloy, or the like.

Similarly, in the thickness direction X of the wall portion, the second current collecting member 26 is arranged between the electrode terminal 22 and the second tab 233, and two sides of the second current collecting member 26 are respectively connected to the electrode terminal 22 and the second tab 233 to achieve electrical connection between the second tab 233 and the electrode terminal 22.

Optionally, the connection structure between the second current collecting member 26 and the second tab 233 may be varied, such as welding or abutment. Likewise, the connection structure between the second current collecting member 26 and the electrode terminal 22 may also be varied, such as welding or abutment.

The second current collecting member 26 functions to electrically connect the second tab 233 and the electrode terminal 22. The second current collecting member 26 may be made of various materials, for example, the material of the second current collecting member 26 may be copper, iron, aluminum, steel, aluminum alloy, or the like.

For example, in FIG. 5, the first current collecting member 25 and the second current collecting member 26 have the same thickness in the thickness direction X of the wall portion, and the height of the connecting portion 2112 protruding from the first surface 2111 is equal to the height of the electrode terminal 22 protruding from the first surface 2111, so that it is convenient for the first current collecting member 25 to be connected to the wall portion 211 through the connecting portion 2112, and convenient for the second current collecting member 26 to be connected to the electrode terminal 22.

The first current collecting member 25 is arranged between the connecting portion 2112 of the wall portion 211 and the first tab 232, and the first current collecting member 25 connects the connecting portion 2112 and the first tab 232 to achieve electrical connection between the first tab 232 and the wall portion 211, which is conducive to reducing the difficulty of electrical connection between the first tab 232 and the connecting portion 2112. Similarly, by arranging the second current collecting member 26 between the electrode terminal 22 and the second tab 233, and connecting the electrode terminal 22 and the second tab 233 by the second current collecting member 26, electrical connection between the second tab 233 and the electrode terminal 22 is achieved, which helps reduce the difficulty of electrical connection between the second tab 233 and the electrode terminal 22. In addition, by arranging the first current collecting member 25 at an interval from the second current collecting member 26, a short circuit phenomenon between the first current collecting member 25 and the second current collecting member 26 can be reduced, which is conducive to reducing the risk when using the battery cell 20.

According to some embodiments of the present application, referring to FIG. 5 and FIG. 6, in the thickness direction X of the wall portion, the first current collecting member 25 has a third surface 251 facing the wall portion 211, the third surface 251 being connected to the connecting portion 2112, and the second current collecting member 26 has a fourth surface 261 facing the wall portion 211, the fourth surface 261 being connected to the electrode terminal 22; where the third surface 251 is flush with the fourth surface 261.

The third surface 251 is flush with the fourth surface 261, that is, in the thickness direction X of the wall portion, a distance between the first current collecting member 25 and the first surface 2111 of the wall portion 211 is equal to a distance between the second current collecting member 26 and the first surface 2111 of the wall portion 211, so that the height of the connecting portion 2112 protruding from the first surface 2111 is equal to the height of the electrode terminal 22 protruding from the first surface 2111, so as to improve the quality of connections between the first current collecting member 25 and the connecting portion 2112 and between the second current collecting member 26 and the electrode terminal 22.

By setting the third surface 251 of the first current collecting member 25 to be a structure flush with the fourth surface 261 of the second current collecting member 26, on the one hand, it is convenient to assemble the first current collecting member 25 and the second current collecting member 26, which is conducive to reducing the difficulty of assembling the first current collecting member 25 and the second current collecting member 26 between the wall portion 211 and the electrode assembly 23; on the other hand, the connecting portion 2112 arranged on the first surface 2111 of the wall portion 211 is capable of compensating for a gap between the first current collecting member 25 and the wall portion 211, so that the first current collecting member 25 is capable of being electrically connected to the wall portion 211, and the contact effect between the first current collecting member 25 and the wall portion 211 is capable of being improved.

In some embodiments, still referring to FIG. 5 and FIG. 6, in the thickness direction X of the wall portion, the first tab 232 has a fifth surface 2321 facing the wall portion 211, the first current collecting member 25 being connected to the fifth surface 2321, and the second tab 233 has a sixth surface 2331 facing the wall portion 211, the second current collecting member 26 being connected to the sixth surface 2331, and the fifth surface 2321 is flush with the sixth surface 2331.

The fifth surface 2321 is flush with the sixth surface 2331, that is, in the thickness direction X of the wall portion, a distance between the first tab 232 and the first surface 2111 of the wall portion 211 is equal to a distance between the second tab 233 and the first surface 2111 of the wall portion 211, so that in an embodiment where the third surface 251 of the first current collecting member 25 and the fourth surface 261 of the second current collecting member 26 are flush with each other, it is capable of achieving a structure that the first current collecting member 25 and the second current collecting member 26 have equal thicknesses and flush with each other.

By setting the fifth surface 2321 of the first tab 232 facing the wall portion 211 and the sixth surface 2331 of the second tab 233 facing the wall portion 211 to be structures flush with each other, on the one hand, it is convenient to process the first tab 232 and the second tab 233, and on the other hand, it is capable of achieving that the first current collecting member 25 and the second current collecting member 26 are structures flush with each other on the side facing the electrode assembly 23 in the thickness direction X of the wall portion, so as to reduce a position difference between the first current collecting member 25 and the second current collecting member 26 in the thickness direction X of the wall portion, thereby being conducive to reducing the difficulty of assembling the first current collecting member 25 and the second current collecting member 26 between the electrode assembly 23 and the wall portion 211, and improving the internal space utilization of the battery cell 20.

Figure 9:
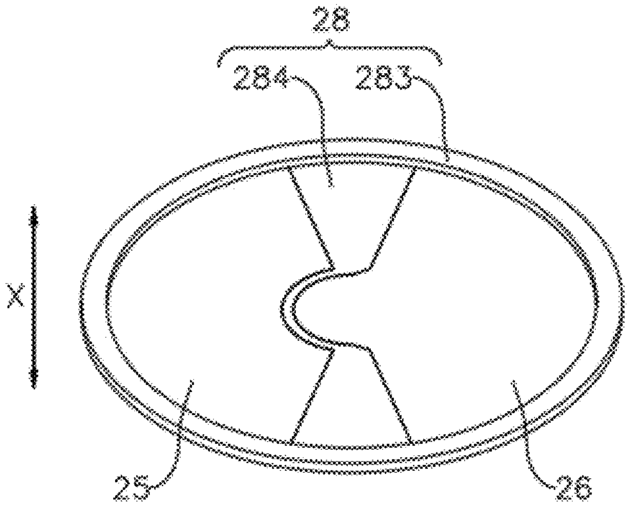
FIG. 9 is a schematic connection diagram of a first current collecting member and a second current collecting member assembled on a first insulating member in a battery cell according to some embodiments of the present application.
Figure 10:
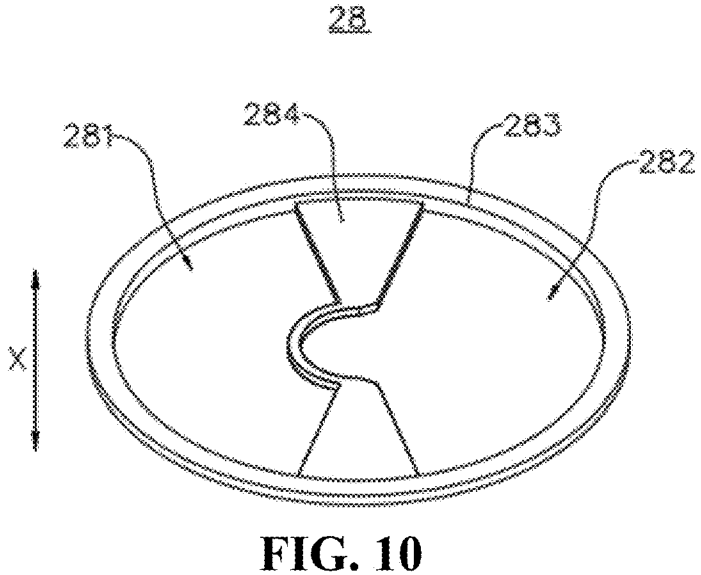
FIG. 10 is a schematic structural diagram of a first insulating member of a battery cell according to some embodiments of the present application.

According to some embodiments of the present application, referring to FIG. 4 and FIG. 5, and further referring to FIG. 9 and FIG. 10, FIG. 9 is a schematic connection diagram of a first current collecting member 25 and a second current collecting member 26 assembled on a first insulating member 28 in a battery cell 20 according to some embodiments of the present application; and FIG. 10 is a schematic structural diagram of a first insulating member 28 of a battery cell 20 according to some embodiments of the present application. The battery cell 20 may further include a first insulating member 28. The first insulating member 28 is arranged between the electrode assembly 23 and the wall portion 211. The first insulating member 28 insulates and isolates the first current collecting member 25 from the second current collecting member 26.

The first insulating member 28 provides insulation and isolation functions for the first current collecting member 25 and the second current collecting member 26. The first insulating member 28 may be made of rubber, silicone, plastic, or the like.

The first insulating member 28 insulates and isolates the first current collecting member 25 from the second current collecting member 26. In other words, at least part of the first insulating member 28 is located between the first current collecting member 25 and the second current collecting member 26 so that the first current collecting member 25 and the second current collecting member 26 do not contact with each other. That is, the first insulating member 28 is capable of separating the first current collecting member 25 and the second current collecting member 26.

The first insulating member 28 is arranged between the electrode assembly 23 and the wall portion 211, and the first insulating member 28 is configured to insulate and isolate the first current collecting member 25 from the second current collecting member 26, thereby achieving insulation and isolation between the first current collecting member 25 and the second current collecting member 26, which is conducive to further reducing the risk of short circuit between the first current collecting member 25 and the second current collecting member 26.

In some embodiments, still referring to FIG. 4, FIG. 5, FIG. 9, and FIG. 10, the first insulating member 28 is provided with a first mounting hole 281 and a second mounting hole 282 arranged at an interval, the first current collecting member 25 is arranged in the first mounting hole 281, and the second current collecting member 26 is arranged in the second mounting hole 282.

The first insulating member 28 is provided with the first mounting hole 281 and the second mounting hole 282 arranged at an interval. In other words, the first mounting hole 281 and the second mounting hole 282 arranged on the first insulating member 28 do not contact with each other, so that the first insulating member 28 is further capable of providing an assembling function for the first current collecting member 25 and the second current collecting member 26. As shown in FIG. 10, the first mounting hole 281 and the second mounting hole 282 are structures that penetrate both sides of the first insulating member 28 in the thickness direction X of the wall portion.

For example, the first current collecting member 25 is clamped into the first mounting hole 281. Of course, in other embodiments, the first current collecting member 25 can also be connected to the first mounting hole 281 by bonding or bolting. Similarly, the second current collecting member 26 is clamped into the second mounting hole 282. Of course, in other embodiments, the second current collecting member 26 can also be connected to the second mounting hole 282 by bonding or bolting.

The first mounting hole 281 and the second mounting hole 282 are arranged at an interval on the first insulating member 28, and the first current collecting member 25 and the second current collecting member 26 are respectively arranged in the first mounting hole 281 and the second mounting hole 282, on the one hand, the first current collecting member 25 and the second current collecting member 26 are capable of being assembled to the first insulating member 28, so that the first insulating member 28 is capable of supporting and assembling the first current collecting member 25 and the second current collecting member 26, which is conducive to reducing the difficulty of arranging the first current collecting member 25 and the second current collecting member 26 between the wall portion 211 and the electrode assembly 23. On the other hand, the first current collecting member 25 and the second current collecting member 26 are capable of being arranged at an interval on the first insulating member 28 to achieve insulation and isolation between the first current collecting member 25 and the second current collecting member 26.

In some embodiments, referring to FIG. 9 and FIG. 10, the first insulating member 28 may include a first insulator 283 and a second insulator 284. The first insulator 283 is an annular structure. The second insulator 284 is connected to the first insulator 283. The second insulator 284 is configured to separate the inner space of the first insulator 283 into the first mounting hole 281 and the second mounting hole 282. The second insulator 284 is located between the first current collecting member 25 and the second current collecting member 26.

The first insulator 283 is the annular structure. In other words, the first insulator 283 is a ring structure connected end to end, and the shape of the first insulator 283 may be varied. For example, referring to FIG. 9 and FIG. 10, the first insulator 283 is of a circular ring structure, and the first insulator 283 surrounds outer sides of the first current collecting member 25 and the second current collecting member 26. In other words, the first insulator 283 is an annular structure, and the first current collecting member 25 and the second current collecting member 26 are both located on an inner side of the first insulator 283.

The second insulator 284 is connected to the first insulator 283, and the second insulator 284 is configured to separate the internal space of the first insulator 283 into the first mounting hole 281 and the second mounting hole 282. The second insulator 284 is located between the first current collecting member 25 and the second current collecting member 26. In other words, the second insulator 284 is located on the inner side of the first insulator 283, and both ends of the second insulator 284 are connected to an inner circumferential surface of the first insulator 283 to separate the internal space of the first insulator 283 into two assembling spaces, namely the first mounting hole 281 and the second mounting hole 282.

Optionally, the first insulator 283 and the second insulator 284 may be an integrally formed structure or separately arranged structures. For example, in FIG. 10, the first insulator 283 and the second insulator 284 are the integrally formed structure, and the first insulator 283 and the second insulator 284 can be manufactured by an integral forming process such as injection molding, stamping, or extrusion molding.

The first insulating member 28 is provided with the first insulator 283 of an annular structure and the second insulator 284 connected to the inner side of the first insulator 283, and the second insulator 284 is configured to separate the internal space of the first insulator 283 into the first mounting hole 281 and the second mounting hole 282, so that the first insulator 283 and the second insulator 284 jointly define the first mounting hole 281 and the second mounting hole 282 for assembling the first current collecting member 25 and the second current collecting member 26. The first insulating member 28 with such a structure is capable of, on the one hand, surrounding around the outer sides of the first current collecting member 25 and the second current collecting member 26 by the first insulator 283, so that the first current collecting member 25 and the second current collecting member 26 are capable of being separated from the shell 21, which is conducive to reducing the risk of short circuit between the first current collecting member 25 and the second current collecting member 26 and the shell 21; on the other hand, the first current collecting member 25 and the second current collecting member 26 are capable of being separated by the second insulator 284, which is conducive to reducing the risk of short circuit between the first current collecting member 25 and the second current collecting member 26.

According to some embodiments of the present application, referring to FIG. 3, FIG. 4, and FIG. 5, the shell 21 is cylindrical, and the central axis of the shell 21 extends in the thickness direction X of the wall portion.

The shell 21 is cylindrical, and correspondingly, the end cover 213 is of a circular plate structure, so that the battery cell 20 is cylindrical. Similarly, the main body part 231 of the electrode assembly 23 is also cylindrical.

The shell 21 is set to be cylindrical so as to facilitate processing to form a battery cell 20 with a cylindrical structure, so that the battery cell 20 has advantages such as high capacity, long cycle life, and a wide range of ambient temperature.

According to some embodiments of the present application, referring to FIG. 3, FIG. 4, and FIG. 5, the shell 21 may include the case 212 and the end cover 213. The case 212 includes a side wall 2122 and the wall portion 211. The side wall 2122 encloses a periphery of the wall portion 211, and in the thickness direction X of the wall portion, one end of the side wall 2122 is connected to the wall portion 211, the other end encloses to form the opening 2121, and the side wall 2122 and the wall portion 211 together define the accommodating cavity for accommodating the electrode assembly 23. The end cover 213 closes the opening 2121.

The side wall 2122 is arranged around the periphery of the wall portion 211, and in the thickness direction X of the wall portion, one end of the side wall 2122 is connected to the wall portion 211, and the other end encloses to form the opening 2121. In other words, the wall portion 211 is the bottom wall 2123 of the case 212 arranged opposite to the end cover 213 in the thickness direction X of the wall portion. Correspondingly, the end cover 213 covers the opening 2121 at one end of the side wall 2122 away from the wall portion 211.

Optionally, the side wall 2122 and the wall portion 211 of the case 212 may be separate structures or an integrated structure. For example, in FIG. 4, the side wall 2122 and the wall portion 211 of the case 212 are an integrally formed structure, and the case 212 can be manufactured by an integral forming process such as stamping, casting, or extrusion molding. In the embodiment where the side wall 2122 and the wall portion 211 of the case 212 are separately arranged, the wall portion 211 may be connected to one end away from the end cover 213 by a structure such as welding, bonding, or clamping.

By setting the wall portion 211 of the shell 21 as the bottom wall 2123 of the case 212 arranged opposite to the end cover 213, the wall portion 211 provided with the electrode terminal 22 and configured for electrical connection with the first tab 232 is capable of being kept away from the end cover 213, thereby being capable of reducing the influence of the stress generated when the end cover 213 and the case 212 are connected to each other on the wall portion 211 or the electrode terminal 22 arranged on the wall portion 211, which is conducive to improving the reliability and service life of the battery cell 20.

It should be noted that the structure of the battery cell 20 is not limited thereto. In some embodiments, the battery cell 20 may be of other structures. For example, the shell 21 may include the case 212 and the end cover 213. The case 212 is provided with the accommodating cavity having the opening 2121, and the accommodating cavity is used for accommodating the electrode assembly 23. The end cover 213 closes the opening 2121, and the end cover 213 is the wall portion 211. In other words, the electrode terminal 22 is mounted on the end cover 213 in an insulated manner, and the connecting portion 2112 is arranged to protrude from the side of the end cover 213 facing the electrode assembly 23.

By setting the wall portion 211 of the shell 21 as the end cover 213 of the shell 21 for closing the opening 2121 of the case 212, the battery cell 20 adopting this structure is conducive to assembling the electrode terminal 22 on the end cover 213, and it is capable of reducing the difficulties of electrical connections of the first tab 232 and the second tab 233 to the end cover 213 and the electrode terminal 22, respectively, thereby being conducive to reducing the manufacturing difficulty of the battery cell 20, so as to improve the production efficiency of the battery cell 20.

According to some embodiments of the present application, a battery 100 is further provided in the present application, and the battery 100 includes the battery cell 20 according to any of the above solutions.

As shown in FIG. 2, the battery 100 may further include a box 10, and the battery cell 20 is accommodated in the box 10.

In some embodiments, the box 10 includes a first box body 11 and a second box body 12. The first box body 11 and the second box body 12 cover each other, and the first box body 11 and the second box body 12 together define an assembling space for accommodating the battery cell 20.

Optionally, the second box body 12 may be of a hollow structure with one end open, the first box body 11 may be of a plate-like structure, and the first box body 11 covers the opening side of the second box body 12, so that the first box body 11 and the second box body 12 together define the assembling space. Both of the first box body 11 and the second box body 12 may also be of a hollow structure with one side open, and the opening side of the first box body 11 covers the opening side of the second box body 12.

Of course, the box 10 formed by the first box body 11 and the second box body 12 may be in a variety of shapes, such as a cylinder, a rectangular solid, or the like. For example, in FIG. 2, the box 10 is of a rectangular solid structure.

Optionally, there may be one or a plurality of battery cells 20 arranged in the box 10. For example, in FIG. 2, there may be a plurality of battery cells 20 arranged in the box 10 of the battery 100, and the plurality of battery cells 20 may be connected in series, in parallel, or in parallel-series, and the parallel-series connection means that the plurality of battery cells 20 are connected in both series and parallel. The plurality of battery cells 20 may be directly connected in series, in parallel, or in parallel-series, and then the entirety formed by the plurality of battery cells 20 is accommodated in the box 10. Of course, the battery 100 may also be an entirety formed by connecting the plurality of battery cells 20 in series, in parallel, or in parallel-series to form battery modules and then connecting the plurality of battery modules in series, in parallel, or in parallel-series, and the entirety is then accommodated in the box 10.

The battery 100 may further include other structures. For example, the battery 100 may further include a convergence component, and the convergence component connects the plurality of battery cells 20 so as to realize the electrical connections between the plurality of battery cells 20.

It should be noted that, in some embodiments, the battery 100 may not be provided with a box 10. The battery 100 includes a plurality of battery cells 20, and the battery 100 composed of the plurality of battery cells 20 may be directly assembled on an electrical apparatus to provide electrical energy to the electrical apparatus through the plurality of battery cells 20. In other words, the box 10 may be used as a part of an electrical apparatus. The electrical apparatus is, for example, a vehicle 1000, and the box 10 may be used as a part of a chassis structure of the vehicle 1000. For example, a part of the box 10 may become at least a part of a floor of the vehicle 1000, or a part of the box 10 may be at least a part of a cross beam and a longitudinal beam of the vehicle 1000.

According to some embodiments of the present application, an electrical apparatus is further provided in the present application, and the electrical apparatus includes the battery cell 20 according to any of the above solutions, and the battery cell 20 is configured to provide electric energy for the electrical apparatus.

The electrical apparatus may be any of the above-mentioned devices or systems applying the battery cell 20.

According to some embodiments of the present application, referring to FIG. 3 to FIG. 7 and FIG. 9 to FIG. 10, the present application provides a battery cell 20. The battery cell 20 includes a shell 21, an electrode terminal 22, an electrode assembly 23, a first current collecting member 25, a second current collecting member 26, and a first insulating member 28. The shell 21 includes a case 212 and an end cover 213. The shell 21 has a wall portion 211. The case 212 includes a side wall 2122 and a bottom wall 2123. The side wall 2122 is arranged around the periphery of the bottom wall 2123. In the thickness direction X of the wall portion, one end of the side wall 2122 is connected to the bottom wall 2123, and the other end encloses to form an opening 2121. The side wall 2122 and the bottom wall 2123 together define an accommodating cavity. The bottom wall 2123 is the wall portion 211, and the end cover 213 closes the opening 2121. In the thickness direction X of the wall portion, the wall portion 211 has a first surface 2111 facing the accommodating cavity and a second surface 2114 facing away from the accommodating cavity, a connecting portion 2112 is arranged to protrude from the first surface 2111, a groove 2115 is formed on the second surface 2114 at a position corresponding to the connecting portion 2112, and the groove 2115 is in a shape the same as that of the connecting portion 2112. A minimum width of the groove 2115 is W, meeting W≥5 mm. In the thickness direction X of the wall portion, a projection area of the groove 2115 is $S_1$, a projection area of the wall portion 211 is $S_2$, meeting $0.1S_2 \le S_1 \le 0.5S_2$. The groove 2115 is an arc-shaped groove extending in an arc trajectory, the shell 21 is cylindrical, a central axis of the shell 21 extends in the thickness direction X of the wall portion, and the central axis of the shell 21 passes through the center of the arc trajectory of the groove 2115. In the thickness direction X of the wall portion, the dimension of the connecting portion 2112 protruding from the first surface 2111 is $D_1$, meeting $D_1 \le 8$ mm. The electrode terminal 22 is mounted on the wall portion 211 in an insulated manner. The wall portion 211 is provided with an assembly hole 2113. The assembly hole 2113 penetrates the wall portion 211 in the thickness direction X of the wall portion. The electrode terminal 22 is arranged in the assembly hole 2113 and protrudes from the first surface 2111. The dimension of the connecting portion 2112 protruding from the first surface 2111 is $D_1$, and the dimension of the electrode terminal 22 protruding from the first surface 2111 is $D_2$, meeting $D_1=D_2$. The electrode assembly 23 is accommodated in the accommodating cavity of the shell 21, and the electrode assembly 23 includes a main body part 231, a first tab 232, and a second tab 233. The main body part 231 is cylindrical, and a central axis of the main body part 231 extends in the thickness direction X of the wall portion. The first tab 232 and the second tab 233 have opposite polarities. In the thickness direction X of the wall portion, the first tab 232 and the second tab 233 are both arranged at one end of the main body part 231 facing the wall portion 211. The first current collecting member 25 is located between the connecting portion 2112 and the first tab 232. The groove bottom wall 2123 of the groove 2115 is welded to the first current collecting member 25. The first current collecting member 25 is connected to the first tab 232 to electrically connect the first tab 232 and the wall portion 211. The second current collecting member 26 is located between the electrode terminal 22 and the second tab 233, the second current collecting member 26 and the first current collecting member 25 are arranged at an interval, and the second current collecting member 26 connects the electrode terminal 22 and the second tab 233, so as to electrically connect the electrode terminal 22 and the second tab 233. In the thickness direction X of the wall portion, the first current collecting member 25 has a third surface 251 facing the wall portion 211, the third surface 251 being connected to the connecting portion 2112, and the second current collecting member 26 has a fourth surface 261 facing the wall portion 211, the fourth surface 261 being connected to the electrode terminal 22; where the third surface 251 is flush with the fourth surface 261. In the thickness direction X of the wall portion, the first tab 232 has a fifth surface 2321 facing the wall portion 211, the first current collecting member 25 being connected to the fifth surface 2321, and the second tab 233 has a sixth surface 2331 facing the wall portion 211, the second current collecting member 26 being connected to the sixth surface 2331, and the fifth surface 2321 is flush with the sixth surface 2331. The first insulating member 28 is arranged between the electrode assembly 23 and the wall portion 211. The first insulating member 28 includes a first insulator 283 and a second insulator 284. The first insulator 283 is an annular structure. The second insulator 284 is connected to the first insulator 283. The second insulator 284 is configured to separate the internal space of the first insulator 283 into a first mounting hole 281 and a second mounting hole 282. The first current collecting member 25 is arranged in the first mounting hole 281, and the second current collecting member 26 is arranged in the second mounting hole 282. The first insulator 283 surrounds outer sides of the first current collecting member 25 and the second current collecting member 26, and the second insulator 284 is located between the first current collecting member 25 and the second current collecting member 26.

It should be noted that, without conflict, embodiments in the present application and features in the embodiments may be combined together.

The above are only preferred examples of the present application, and are not intended to limit the present application. For those skilled in the art, the present application may have various modifications and changes. Any modification, equivalent replacement, improvement, etc. made within the spirit and principle of the present application shall fall within the scope of protection of the present application.

What is claimed is:

1. A battery cell, comprising:

a shell, having a wall portion;

an electrode terminal mounted on the wall portion in an insulated manner; and an electrode assembly accommodated in the shell, wherein the electrode assembly comprises a main body part, a first tab, and a second tab, the first tab and the second tab have opposite polarities, and in a thickness direction of the wall portion, the first tab and the second tab are both arranged at one end of the main body part facing the wall portion; and, wherein in the thickness direction of the wall portion, the wall portion has a first surface facing the electrode assembly and a second surface facing away from the first surface, a connecting portion is arranged to protrude from the first surface, a groove is formed on the second surface corresponding to a position of the connecting portion, the connecting portion is electrically connected to the first tab, and the electrode terminal is electrically connected to the second tab;

the battery cell further comprises a first current collecting member, the first current collecting member is connected to the first tab, a groove bottom wall of the groove is welded to the first current collecting member to electrically connect the first tab and the wall portion;

the battery cell further comprises a second current collecting member located between the electrode terminal and the second tab, the second current collecting member being arranged at an interval from the first current collecting member, and the second current collecting member connecting the electrode terminal and the second tab;

the battery cell further comprises a first insulating member arranged between the electrode assembly and the wall portion, the first insulating member being insulating and isolating the first current collecting member from the second current collecting member;

the first insulating member is provided with a first mounting hole and a second mounting hole arranged at an interval, the first current collecting member is arranged in the first mounting hole, and the second current collecting member is arranged in the second mounting hole, the first insulating member comprises a first insulator of an annular structure and a second insulator connected to the first insulator, wherein the second insulator is configured to separate an internal space of the first insulator into the first mounting hole and the second mounting hole, and the second insulator is located between the first current collecting member and the second current collecting member, the second insulator is located on an inner side of the first insulator, and both ends of the second insulator are connected to an inner circumferential surface of the first insulator, such that the first insulator and the second insulator jointly define the first mounting hole and the second mounting hole; and in the thickness direction of the wall portion, a projection area of the groove is $S_1$, a projection area of the wall portion is $S_2$, meeting $0.1S_2 \leq S_1 \leq 0.5S_2$.

2. The battery cell according to claim 1, wherein a minimum width of the groove is W, meeting W≥5 mm.

3. The battery cell according to claim 1, wherein the groove is an arc-shaped groove extending in an arc trajectory.

4. The battery cell according to claim 3, wherein the shell is cylindrical, a central axis of the shell extends in the thickness direction of the wall portion, and the central axis of the shell passes through a center of the arc trajectory of the groove.

5. The battery cell according to claim 1, wherein in the thickness direction of the wall portion, a dimension of the connecting portion protruding from the first surface is $D_1$, meeting $D_1 \leq 8$ mm.

6. The battery cell according to claim 1, wherein a plurality of the connecting portions are arranged to protrude from the first surface.

7. The battery cell according to claim 1, wherein the wall portion is provided with an assembly hole, the assembly hole penetrates the wall portion in the thickness direction of the wall portion, and the electrode terminal is arranged in the assembly hole and protrudes from the first surface.

8. The battery cell according to claim 7, wherein in the thickness direction of the wall portion, a dimension of the connecting portion protruding from the first surface is $D_1$, and a dimension of the electrode terminal protruding from the first surface is $D_2$, meeting $D_1 = D_2$.

9. The battery cell according to claim 1, wherein in the thickness direction of the wall portion, the first current collecting member has a third surface facing the wall portion, the third surface being connected to the connecting portion, and the second current collecting member has a fourth surface facing the wall portion, the fourth surface being connected to the electrode terminal;

wherein the third surface is flush with the fourth surface.

10. The battery cell according to claim 1, wherein in the thickness direction of the wall portion, the first tab has a fifth surface facing the wall portion, the first current collecting member being connected to the fifth surface, and the second tab has a sixth surface facing the wall portion, the second current collecting member being connected to the sixth surface;

wherein the fifth surface is flush with the sixth surface.

11. The battery cell according to claim 1, wherein the shell is cylindrical, and a central axis of the shell extends in the thickness direction of the wall portion.

12. The battery cell according to claim 1, wherein the shell comprises:

a case comprising a side wall and the wall portion, wherein the side wall encloses a periphery of the wall portion, and in the thickness direction of the wall portion, one end of the side wall is connected to the wall portion, the other end encloses to form an opening, and the side wall and the wall portion together define an accommodating cavity for accommodating the electrode assembly; and an end cover closing the opening.

13. The battery cell according to claim 12, wherein the wall portion is a bottom wall of the case and is arranged opposite to the end cover in the thickness direction of the wall portion.

14. The battery cell according to claim 1, wherein the shell comprises:

a case provided with an accommodating cavity having an opening formed therein, wherein the accommodating cavity is configured to accommodate the electrode assembly; and an end cover closing the opening;

wherein the end cover is the wall portion.

15. A battery, comprising the battery cell according to claim 1.

16. An electrical apparatus, comprising the battery cell according to claim 1, wherein the battery cell is configured to provide electric energy.

17. The battery cell according to claim 1, wherein the first insulator surrounds outer sides of the first current collecting member and the second current collecting member, and the second insulator is located between the first current collecting member and the second current collecting member.

18. The battery cell according to claim 1, wherein the first insulator and the second insulator are an integrally formed structure.

* * * * *